United States Patent
Ibrahim et al.

(10) Patent No.: US 11,902,816 B2
(45) Date of Patent: Feb. 13, 2024

(54) ADAPTIVE CROSS-LINK INTERFERENCE MEASUREMENT AND REPORTING FRAMEWORK

(71) Applicant: QUALCOMM Incorporated, San Diego, CA (US)

(72) Inventors: Abdelrahman Mohamed Ahmed Mohamed Ibrahim, San Diego, CA (US); Muhammad Sayed Khairy Abdelghaffar, San Jose, CA (US); Huilin Xu, Temecula, CA (US); Ahmed Attia Abotabl, San Diego, CA (US); Seyedkianoush Hosseini, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 184 days.

(21) Appl. No.: 17/450,634

(22) Filed: Oct. 12, 2021

(65) Prior Publication Data
US 2023/0113873 A1    Apr. 13, 2023

(51) Int. Cl.
*H04W 24/10*    (2009.01)
*H04L 5/14*    (2006.01)
*H04B 17/336*    (2015.01)

(52) U.S. Cl.
CPC .......... *H04W 24/10* (2013.01); *H04B 17/336* (2015.01); *H04L 5/14* (2013.01)

(58) Field of Classification Search
CPC ......... H04W 24/10; H04B 17/336; H04L 5/14
See application file for complete search history.

(56) References Cited

U.S. PATENT DOCUMENTS

| | | | |
|---|---|---|---|
| 2019/0053088 A1* | 2/2019 | Jo | H04W 72/542 |
| 2021/0067991 A1* | 3/2021 | Zhu | H04W 8/24 |
| 2021/0144574 A1* | 5/2021 | Jin | H04B 17/318 |
| 2021/0289374 A1* | 9/2021 | Zhang | H04W 16/28 |
| 2022/0022073 A1* | 1/2022 | Zhang | H04W 72/542 |
| 2022/0060265 A1* | 2/2022 | Xu | H04L 5/0094 |
| 2022/0086843 A1* | 3/2022 | Ying | H04W 72/541 |
| 2022/0116129 A1* | 4/2022 | Ying | H04B 17/345 |
| 2022/0159662 A1* | 5/2022 | Li | H04L 5/0044 |
| 2022/0386156 A1* | 12/2022 | Park | H04W 24/10 |

* cited by examiner

*Primary Examiner* — Zhiren Qin
(74) *Attorney, Agent, or Firm* — QUALCOMM Incorporated

(57) ABSTRACT

In a wireless network, a base station may configure a victim user equipment (UE) experiencing interference with a periodic measurement resource using Layer 3 (L3) signaling, and the UE may report cross-link interference (CLI) measurements to the base station using L3 messages. However, using L3 signaling to configure interference measurement and reporting may result in an inflexible interference measurement configuration and a long latency to report CLI and/or self-interference feedback. Furthermore, although Layer 1 and/or Layer 2 (L1/L2) CLI reporting may be more suitable to track and adapt to dynamic changes in interference conditions, L1/L2 signaling increases control signaling and CLI management overhead at the base station. Accordingly, some aspects described herein relate to an adaptive L3 CLI measurement and reporting framework, where L3 messages may include one or more adaptive fields to support flexibility in configuring CLI measurement and/or CLI reporting parameters.

30 Claims, 13 Drawing Sheets

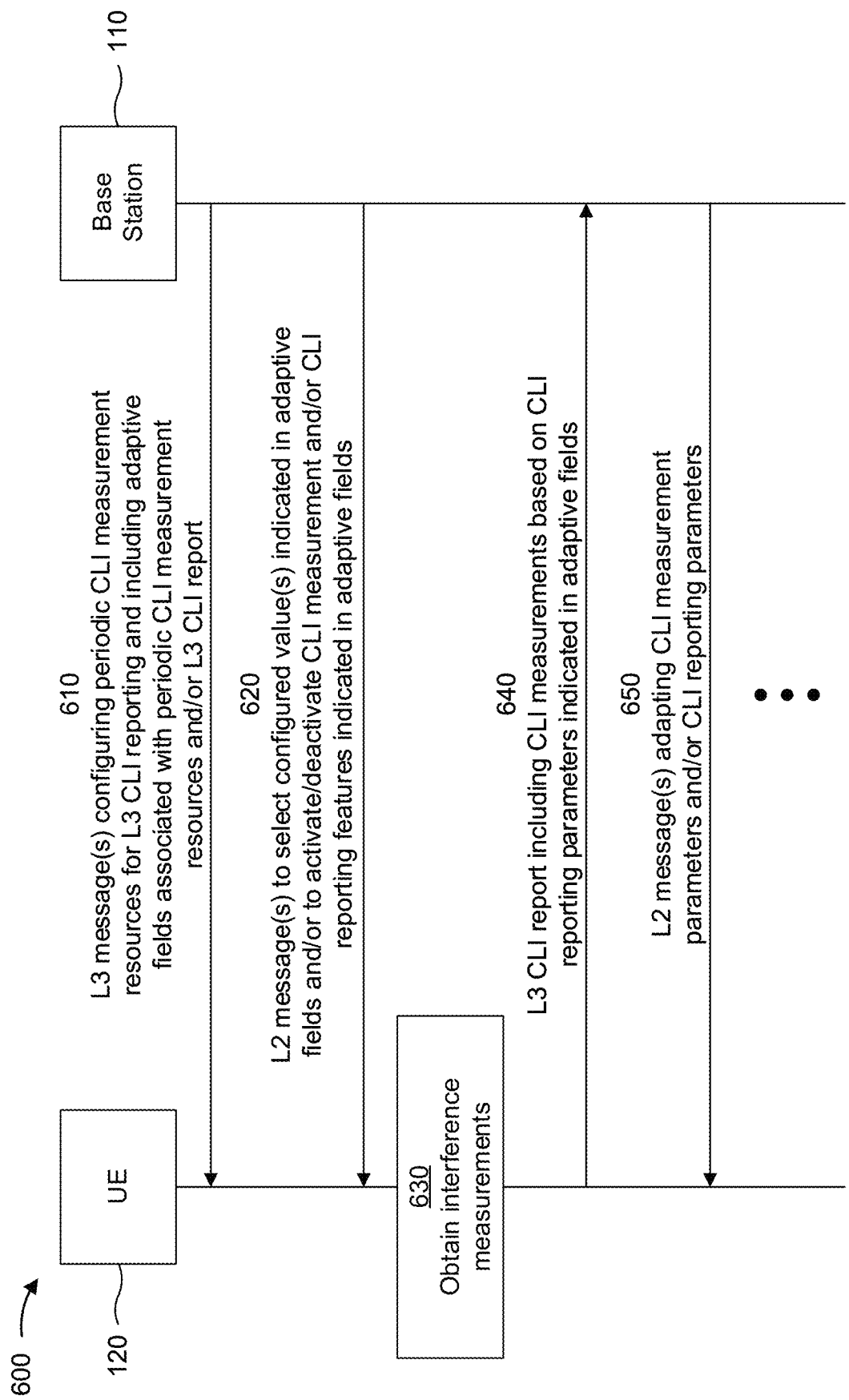

ADAPTIVE CROSS-LINK INTERFERENCE MEASUREMENT AND REPORTING FRAMEWORK

FIELD OF THE DISCLOSURE

Aspects of the present disclosure generally relate to wireless communication and to techniques and apparatuses for providing an adaptive cross-link interference (CLI) measurement and reporting framework.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. 5G, which may be referred to as New Radio (NR), is a set of enhancements to the LTE mobile standard promulgated by the 3GPP. 5G is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in 4G, 5G, and other radio access technologies remain useful.

SUMMARY

In a wireless network, a user equipment (UE) may experience interference that causes degraded reception performance in various scenarios. For example, a victim UE receiving one or more downlink transmissions from a base station may experience inter-cell cross-link interference (CLI) caused by downlink transmissions from nearby base stations in different cells, intra-cell CLI caused by uplink transmissions from other UEs in the same cell (e.g., when the base station communicating with the UE is operating in an in-band full-duplexing (IBFD) mode or a sub-band full-duplexing (SBFD) mode, and/or inter-cell CLI caused by uplink transmissions from other UEs in adjacent cells. For example, the CLI may be experienced at the victim UE in cases where the transmissions from nearby base stations and/or nearby UEs are received at the victim UE, which may interfere with reception of the desired downlink transmission(s) at the victim UE. Furthermore, in cases where the victim UE is configured to operate in a full-duplexing mode (e.g., supporting concurrent or simultaneous uplink transmission and downlink reception), the victim UE may experience self-interference due to the uplink transmission leaking into a receive port and/or an object in an environment surrounding the UE reflecting the uplink transmission back to the receive port.

Accordingly, because there are various scenarios in which a UE may experience CLI and/or self-interference that may degrade downlink reception performance, a base station communicating with a victim UE may configure a UE to obtain measurements related to the interference experienced at the victim UE and report the measurements to the base station (e.g., to enable the base station to select an appropriate downlink beam, resource allocation, and/or other communication parameters to mitigate the interference experienced at the victim UE. For example, in a wireless network, a base station may typically configure the victim UE with a static or semi-static periodic measurement resource using Layer 3 (L3) signaling (e.g., radio resource control (RRC) messages), and the UE may report the interference measurements to the base station using L3 messages. In general, although using L3 signaling to configure the periodic measurement resource and provide the measurement report that includes the interference measurements may provide a low-complexity solution and low control overhead, using static or semi-static RRC signaling may result in an inflexible interference measurement configuration and a long latency to report CLI and/or self-interference feedback. Furthermore, although Layer 1 and/or Layer 2 (L1/L2) CLI reporting may be more suitable to track and adapt to dynamic changes in interference conditions (e.g., dynamic intra-cell CLI that may occur in full-duplex operation), L1/L2 signaling is associated with increased control signaling overhead and increased CLI management overhead at the base station.

Accordingly, some aspects described herein relate to an adaptive L3 CLI measurement and reporting framework, where L3 messages may include one or more adaptive fields to support flexibility in configuring CLI measurement and/or CLI reporting parameters. In this way, the adaptive L3 CLI measurement and reporting framework may balance tradeoffs between a static or semi-static L3 framework and more dynamic L1/L2 frameworks. For example, by including one or more adaptive fields in the L3 messages used to configure CLI measurements and/or CLI reporting, the adaptive L3 CLI measurement and reporting framework described herein may allow more adaptation to dynamic changes in interference conditions than a static or semi-static L3 framework. Furthermore, by using L3 messages to configure CLI measurement parameters and/or CLI reporting parameters and to carry a CLI report from a victim UE to a base station, the adaptive L3 CLI measurement and reporting framework described herein may be associated with a smaller control signaling overhead and a smaller CLI management overhead relative to dynamic L1/L2 frameworks.

Some aspects described herein relate to a UE for wireless communication. The UE may include a memory and one or more processors coupled to the memory. The one or more processors may be configured to receive, from a base station, one or more L3 messages that configure periodic CLI measurement resources, wherein the one or more L3 messages include one or more adaptive CLI measurement fields to indicate one or more parameters associated with the periodic CLI measurement resources. The one or more processors may be configured to obtain one or more CLI measurements based at least in part on the one or more adaptive CLI measurement fields. The one or more processors may be configured to transmit, to the base station, one or more L3 messages carrying a CLI report that includes the one or more CLI measurements.

Some aspects described herein relate to a base station for wireless communication. The base station may include a memory and one or more processors coupled to the memory. The one or more processors may be configured to transmit, to a UE, one or more L3 messages that configure periodic CLI measurement resources, wherein the one or more L3 messages include one or more adaptive CLI measurement fields to indicate one or more parameters associated with the periodic CLI measurement resources. The one or more processors may be configured to receive, from the UE, one or more L3 messages carrying a CLI report, wherein the CLI report includes one or more CLI measurements that are obtained based at least in part on the one or more adaptive CLI measurement fields.

Some aspects described herein relate to a method of wireless communication performed by a UE. The method may include receiving, from a base station, one or more L3 messages that configure periodic CLI measurement resources, wherein the one or more L3 messages include one or more adaptive CLI measurement fields to indicate one or more parameters associated with the periodic CLI measurement resources. The method may include obtaining one or more CLI measurements based at least in part on the one or more adaptive CLI measurement fields. The method may include transmitting, to the base station, one or more L3 messages carrying a CLI report that includes the one or more CLI measurements.

Some aspects described herein relate to a method of wireless communication performed by a base station. The method may include transmitting, to a UE, one or more L3 messages that configure periodic CLI measurement resources, wherein the one or more L3 messages include one or more adaptive CLI measurement fields to indicate one or more parameters associated with the periodic CLI measurement resources. The method may include receiving, from the UE, one or more L3 messages carrying a CLI report, wherein the CLI report includes one or more CLI measurements that are obtained based at least in part on the one or more adaptive CLI measurement fields.

Some aspects described herein relate to a non-transitory computer-readable medium that stores a set of instructions for wireless communication by a UE. The set of instructions, when executed by one or more processors of the UE, may cause the UE to receive, from a base station, one or more L3 messages that configure periodic CLI measurement resources, wherein the one or more L3 messages include one or more adaptive CLI measurement fields to indicate one or more parameters associated with the periodic CLI measurement resources. The set of instructions, when executed by one or more processors of the UE, may cause the UE to obtain one or more CLI measurements based at least in part on the one or more adaptive CLI measurement fields. The set of instructions, when executed by one or more processors of the UE, may cause the UE to transmit, to the base station, one or more L3 messages carrying a CLI report that includes the one or more CLI measurements.

Some aspects described herein relate to a non-transitory computer-readable medium that stores a set of instructions for wireless communication by a base station. The set of instructions, when executed by one or more processors of the base station, may cause the base station to transmit, to a UE, one or more L3 messages that configure periodic CLI measurement resources, wherein the one or more L3 messages include one or more adaptive CLI measurement fields to indicate one or more parameters associated with the periodic CLI measurement resources. The set of instructions, when executed by one or more processors of the base station, may cause the base station to receive, from the UE, one or more L3 messages carrying a CLI report, wherein the CLI report includes one or more CLI measurements that are obtained based at least in part on the one or more adaptive CLI measurement fields.

Some aspects described herein relate to an apparatus for wireless communication. The apparatus may include means for receiving, from a base station, one or more L3 messages that configure periodic CLI measurement resources, wherein the one or more L3 messages include one or more adaptive CLI measurement fields to indicate one or more parameters associated with the periodic CLI measurement resources. The apparatus may include means for obtaining one or more CLI measurements based at least in part on the one or more adaptive CLI measurement fields. The apparatus may include means for transmitting, to the base station, one or more L3 messages carrying a CLI report that includes the one or more CLI measurements.

Some aspects described herein relate to an apparatus for wireless communication. The apparatus may include means for transmitting, to a UE, one or more L3 messages that configure periodic CLI measurement resources, wherein the one or more L3 messages include one or more adaptive CLI measurement fields to indicate one or more parameters associated with the periodic CLI measurement resources. The apparatus may include means for receiving, from the UE, one or more L3 messages carrying a CLI report, wherein the CLI report includes one or more CLI measurements that are obtained based at least in part on the one or more adaptive CLI measurement fields.

Aspects generally include a method, apparatus, system, computer program product, non-transitory computer-readable medium, user equipment, base station, wireless communication device, and/or processing system as substantially described with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

FIG. 6 is a diagram illustrating an example associated with an adaptive cross-link interference measurement and reporting framework.

DETAILED DESCRIPTION

Figure 1:
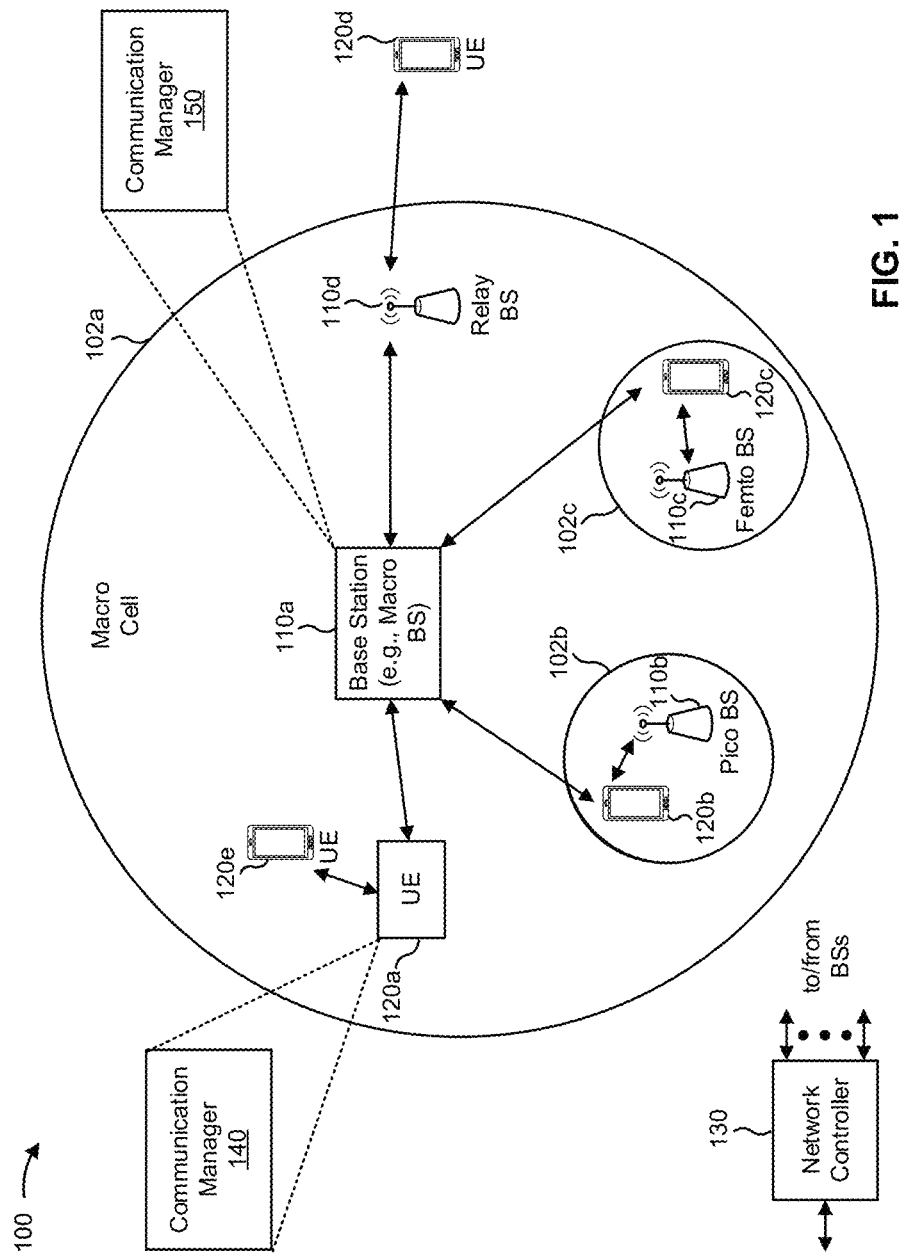
FIG. 1 is diagram illustrating an example of a wireless network.

The detailed description set forth below in connection with the appended drawings is intended as a description of various configurations and is not intended to represent the configurations in which the concepts described herein may be practiced. The detailed description includes specific details for the purposes of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, or the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, or the like, whether referred to as software, firmware, middleware, microcode, hardware description language, or otherwise.

Accordingly, in one or more example embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can include a random-access memory (RAM), a read-only memory (ROM), an electrically erasable programmable ROM (EEPROM), compact disk ROM (CD-ROM) or other optical disk storage, magnetic disk storage or other magnetic storage devices, combinations of the aforementioned types of computer-readable media, or any other medium that can be used to store computer executable code in the form of instructions or data structures that can be accessed by a computer.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 is a diagram illustrating a wireless network 100 in which aspects of the present disclosure may be practiced. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive, from a base station 110, one or more Layer 3 (L3) messages that configure periodic cross-link interference (CLI) measurement resources, wherein the one or more L3 messages include one or more adaptive CLI measurement fields to indicate one or more parameters associated with the periodic CLI measurement resources; obtain one or more CLI measurements based at least in part on the one or more adaptive CLI measurement fields; and transmit, to the base station 110, one or more L3 messages carrying a CLI report that includes the one or more CLI measurements. Additionally, or alternatively, the communication manager 140 may perform one or more other operations described herein.

In some aspects, the base station 110 may include a communication manager 150. As described in more detail elsewhere herein, the communication manager 150 may transmit, to a UE 120, one or more L3 messages that configure periodic CLI measurement resources, wherein the one or more L3 messages include one or more adaptive CLI measurement fields to indicate one or more parameters associated with the periodic CLI measurement resources; and receive, from the UE 120, one or more L3 messages carrying a CLI report, wherein the CLI report includes one or more CLI measurements that are obtained based at least in part on the one or more adaptive CLI measurement fields. Additionally, or alternatively, the communication manager 150 may perform one or more other operations described herein.

As indicated above, FIG. 1 is provided as an example. Other examples may differ from what is described with regard to FIG. 1.

Figure 2:
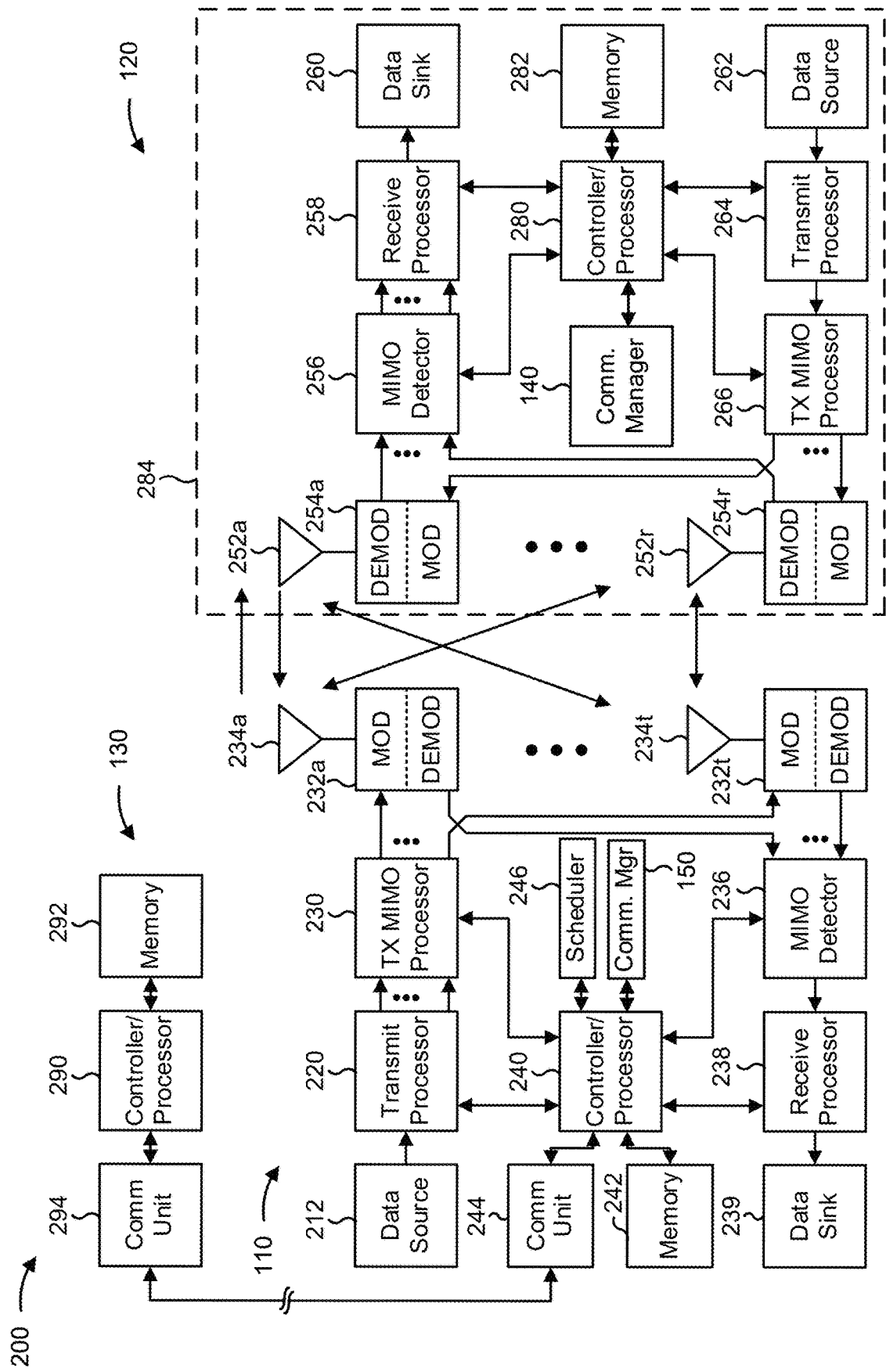
FIG. 2 is a diagram illustrating an example of a base station in communication with a user equipment (UE) in a wireless network.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein.

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein.

The controller/processor 240 of the base station 110, the controller/processor 280 of the UE 120, and/or any other component(s) of FIG. 2 may perform one or more techniques associated with an adaptive cross-link interference (CLI) measurement and reporting framework, as described in more detail elsewhere herein. For example, the controller/processor 240 of the base station 110, the controller/processor 280 of the UE 120, and/or any other component(s) of FIG. 2 may perform or direct operations of, for example, method 700 of FIG. 7, method 800 of FIG. 8, and/or other methods as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, method 700 of FIG. 7, method 800 of FIG. 8, and/or other methods as described herein. In some examples, executing instructions may include running the instructions, converting the instructions, compiling the instructions, and/or interpreting the instructions, among other examples.

In some aspects, the UE 120 includes means for receiving, from the base station 110, one or more Layer 3 (L3) messages that configure periodic CLI measurement resources, wherein the one or more L3 messages include one or more adaptive CLI measurement fields to indicate one or more parameters associated with the periodic CLI measurement resources; means for obtaining one or more CLI measurements based at least in part on the one or more adaptive CLI measurement fields; and/or means for transmitting, to the base station 110, one or more L3 messages carrying a CLI report that includes the one or more CLI measurements. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the base station includes means for transmitting, to the UE 120, one or more L3 messages that configure periodic CLI measurement resources, wherein the one or more L3 messages include one or more adaptive CLI measurement fields to indicate one or more parameters associated with the periodic CLI measurement resources; and/or means for receiving, from the UE 120, one or more L3 messages carrying a CLI report, wherein the CLI report includes one or more CLI measurements that are obtained based at least in part on the one or more adaptive CLI measurement fields. The means for the base station to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
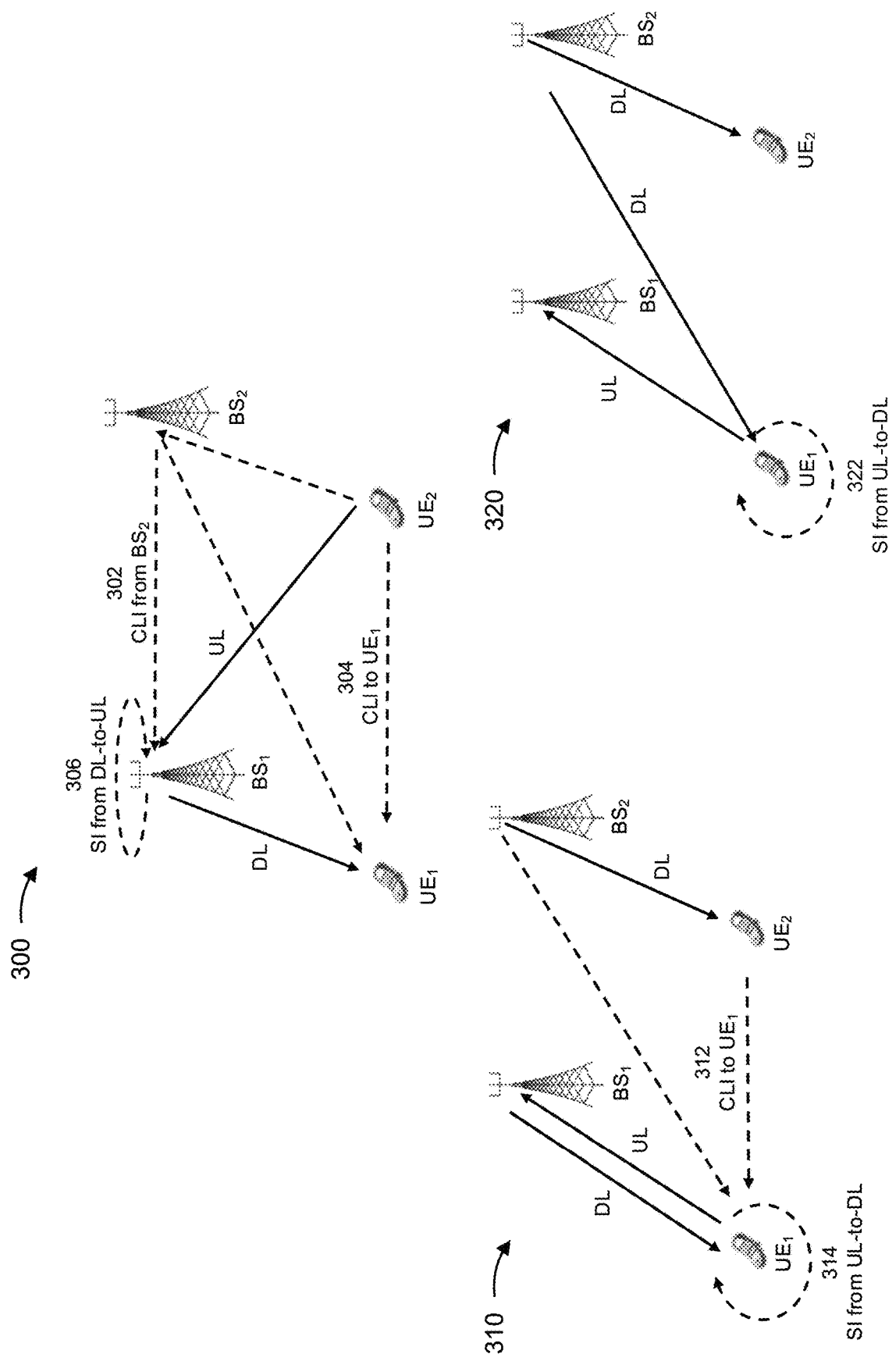
FIG. 3 is a diagram illustrating examples of full-duplex communication modes.

FIG. 3 is a diagram illustrating examples 300, 310, 320 of full-duplex communication modes. As shown in FIG. 3, examples 300, 310, 320 include one or more UEs in communication with one or more base stations in a wireless network that supports full-duplex communication. It will be appreciated that the devices shown in FIG. 3 are exemplary only, and that the wireless network may support full-duplex communication between other devices (e.g., between a UE 120 and a base station 110 or a TRP 110, between a mobile termination node and a control node, between an integrated access and backhaul (IAB) child node and an IAB parent node, and/or between a scheduled node and a scheduling node). In general, as described herein, utilizing a full-duplexing communication mode may provide reduced latency by allowing a downlink transmission to occur in an uplink-only slot and/or by allowing an uplink transmission to occur in a downlink-only slot. In addition, full-duplex communication may enhance spectral efficiency or throughput per cell or per UE and/or enable more efficient resource utilization by simultaneously utilizing time and frequency resources for downlink and uplink communication. However, as described in further detail herein, full-duplexing communication modes may be associated with dynamic interference conditions.

For example, as shown in FIG. 3, example 300 includes a first UE (shown as $UE_1$) and a second UE (shown as $UE_2$) in communication with a first base station (shown as $BS_1$) operating in a full-duplexing mode. For example, as shown in FIG. 3, the first UE may receive one or more downlink transmissions from the first base station, and the second UE may concurrently transmit one or more uplink transmissions to the first base station. Accordingly, in example 300, the first base station is operating in a full-duplexing mode, and the first UE and the second UE are each operating in a half-duplexing node. As shown in FIG. 3, in example 300, there may be various forms of interference that may degrade downlink reception performance at one or more UEs and uplink reception performance at the first base station operating in the full-duplexing mode. For example, as shown at 302, the first base station may experience cross-link interference (CLI) caused by downlink transmissions from a second base station (shown as $BS_2$) that may be located in an adjacent or nearby cell. Furthermore, as shown at 304, the uplink transmission from the second UE to the first base station may cause CLI at the first UE (e.g., CLI that interferes with downlink reception at the first UE). Furthermore, as shown at 306, the first base station may experience self-interference, where the downlink transmission to the first UE interferes with reception of the uplink transmission from the second UE. For example, as described herein, self-interference may generally occur when a transmitted signal leaks into a receive port and/or when an object in a surrounding environment reflects a transmitted signal back to a receive port (e.g., causing a clutter echo effect).

As further shown in FIG. 3, in example 310, the first UE may communicate with the first base station in a full-duplexing mode. For example, in example 310, the first UE may receive one or more downlink transmissions from the first base station, and the first UE may concurrently transmit one or more uplink transmissions to the first base station. Accordingly, in example 310, the first base station and the first UE are both operating in a full-duplexing mode. As shown in FIGS. 3, at 312 and 314, the first UE may experience interference that may degrade downlink reception performance. For example, as shown at 312, the first UE may experience CLI caused by a downlink transmission from a second nearby base station to a second UE located in an adjacent or nearby cell. Furthermore, as shown at 314, the first UE may experience self-interference, where the uplink transmission to the first base station interferes with reception of the downlink transmission from the first base station. Additionally, in example 310, the first base station may experience CLI caused by the downlink transmission from the second base station interfering with reception of the uplink transmission from the first UE.

As further shown in FIG. 3, in example 320, the first UE may communicate with the first base station and the second base station in a full-duplexing mode (e.g., a multi-TRP mode). For example, in example 320, the first UE may transmit one or more uplink transmissions to the first base station, and the first UE may concurrently receive one or more downlink transmissions from the second base station. Accordingly, in example 320, the first UE is operating in a full-duplexing mode, and the first and second base stations are both operating in a half-duplexing mode. As shown in FIG. 3, at 322, the first UE may experience self-interference, where the uplink transmission to the first base station interferes with reception of the downlink transmission from the second base station.

Some aspects described herein generally relate to techniques and apparatuses to improve the manner in which flexible time division duplexing (TDD) operates to support full-duplex communication, which generally refers to simultaneous downlink and uplink transmissions in unpaired spectrum. As described herein, flexible TDD capabilities that support full-duplex communication may be present at a scheduling node (e.g., a base station, a TRP, a control node, and/or a parent node), a scheduled node (e.g., a UE, a mobile termination (MT) node, and/or a child node), or both. For example, at a wireless node having full-duplex capabilities, uplink transmission may be from one antenna panel and downlink reception may be in another antenna panel. In general, full-duplex communication may be conditional on beam separation between an uplink beam and a downlink beam at the respective antenna panels in order to minimize self-interference that may occur when a transmitted signal leaks into a receive port and/or when an object in a surrounding environment reflects a transmitted signal back to a receive port (e.g., causing a clutter echo effect). Furthermore, in full-duplex communication, there may be dynamic changes to CLI that may interfere with downlink reception at a UE (in addition to self-interference in cases where the UE operates in a full-duplexing mode). Accordingly, improving the manner in which uplink and/or downlink transmission parameters are determined or otherwise configured to mitigate CLI is desirable.

For example, some aspects described herein relate to an adaptive Layer (L3) CLI measurement and reporting framework, where L3 messages may include one or more adaptive fields to support flexibility in configuring CLI measurement and/or CLI reporting parameters. In this way, the adaptive L3 CLI measurement and reporting framework may balance tradeoffs between a static or semi-static L3 framework and more dynamic Layer 1 and/or Layer 2 (L1/L2) frameworks. For example, by including one or more adaptive fields in the L3 messages used to configure CLI measurements and/or CLI reporting, the adaptive L3 CLI measurement and reporting framework described herein may allow more adaptation to dynamic changes in interference conditions than a static or semi-static L3 framework. Furthermore, by using L3 messages to configure CLI measurement parameters and/or CLI reporting parameters and to carry a CLI report from a victim UE to a base station, the adaptive L3 CLI measurement and reporting framework described herein may be associated with a smaller control signaling overhead and a smaller CLI management overhead relative to dynamic L1/L2 frameworks. In this way, the adaptive L3 CLI measurement and reporting framework may support adaptation to dynamic changes in CLI conditions (e.g., when full-duplex communication is enabled for one or more nodes) with a small control signaling and a small CLI management overhead.

As indicated above, FIG. 3 is provided as an example. Other examples may differ from what is described with regard to FIG. 3.

Figure 4:
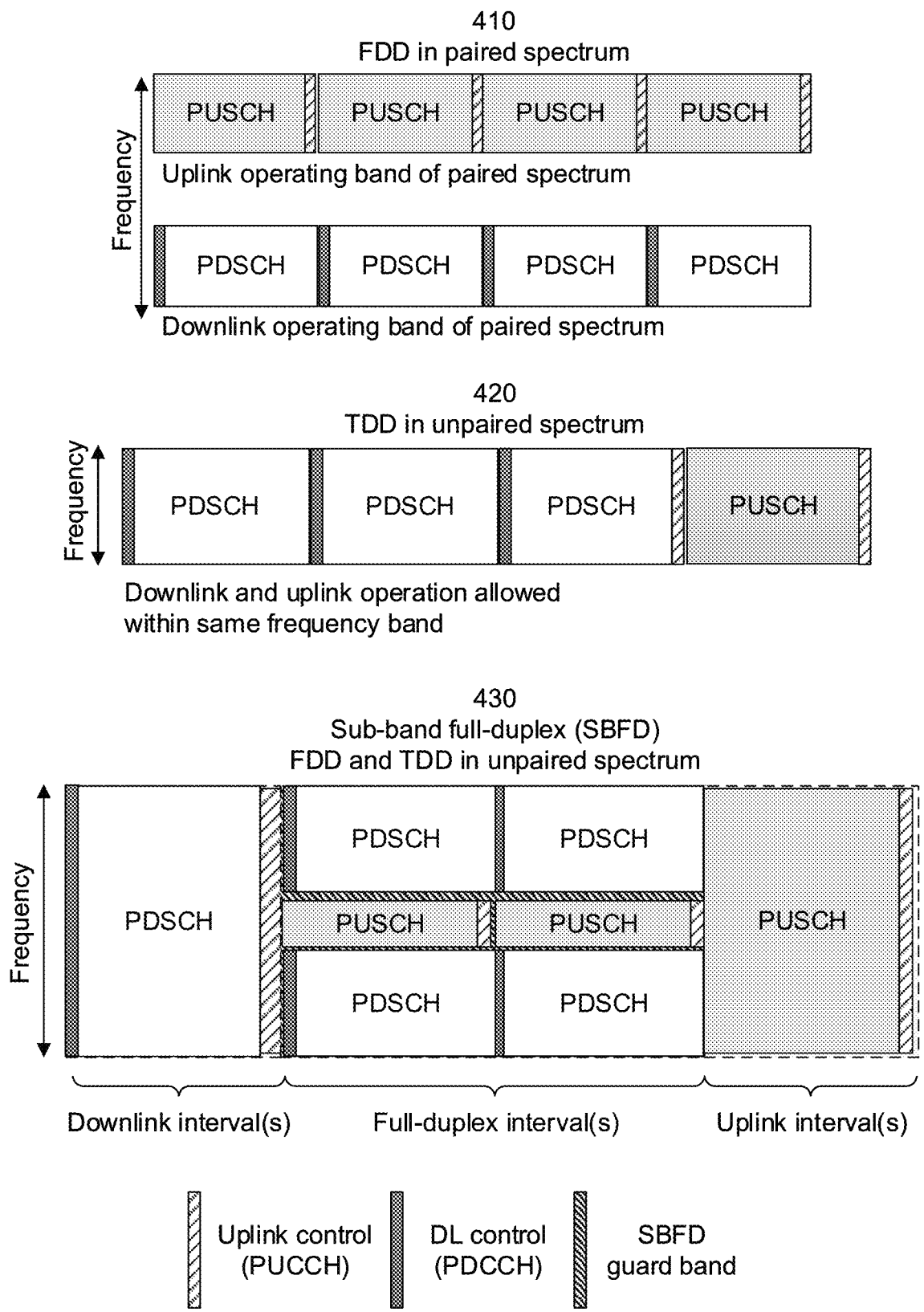
FIG. 4 is a diagram illustrating examples of different duplexing modes.

FIG. 4 is a diagram illustrating examples 410, 420, 430 of different duplexing modes. For example, as described in further detail herein, example 410 illustrates a frequency division duplexing (FDD) mode that may be applied in paired spectrum, example 420 illustrates a TDD mode that may be applied in unpaired spectrum, and example 430 illustrates a sub-band full-duplexing (SBFD) mode that may be applied in unpaired spectrum (e.g., a TDD band). Furthermore, although not shown in FIG. 4, full-duplex communication may be supported in an in-band full-duplexing (IBFD) mode.

In some aspects, a wireless communication standard and/or governing body may generally specify one or more duplexing modes in which a wireless spectrum is to be used. For example, 3GPP may specify how wireless spectrum is to be used for the 5G/NR radio access technology and interface. For example, a specification may indicate whether to use a frequency band as paired spectrum in an FDD mode or as unpaired spectrum in a TDD mode.

For example, as shown by example 410, paired spectrum in FDD mode may use a first frequency region (or channel) for uplink communication and a second frequency region (or channel) for downlink communication. In such cases, the frequency regions or channels used for uplink communication and downlink communication do not overlap, have different center frequencies, and have sufficient separation to prevent interference between the downlink communication and the uplink communication. For example, paired spectrum in FDD mode may include an uplink operating band and a downlink operating band that are configured to use non-overlapped frequency regions separated by a guard band. Accordingly, when operating in FDD mode in paired spectrum, a UE with full-duplex capabilities may perform concurrent transmit and receive operations using the separate operating bands that are allocated to downlink and uplink communication. For example, paired bands in NR include NR operating bands n1, n2, n3, n5, n7, n8, n12, n20, n25, and n28, as specified by 3GPP Technical Specification (TS) 38.101-1.

Alternatively, as shown by example 420, unpaired spectrum in TDD mode may allow downlink and uplink operation within a single frequency region (e.g., a single operating band). For example, when operating in TDD mode in unpaired spectrum, downlink communication and uplink communication may occur in the same frequency range. Some deployments may use TDD in the unpaired band, whereby some transmission time intervals (e.g., frames, slots, and/or symbols) are used for downlink communication only and other transmission time intervals are used for uplink communication only. In this case, substantially the entire bandwidth of a component carrier may be used for downlink communication or uplink communication, depending on whether the communication is performed in a downlink interval, an uplink interval, or a special interval (in which either downlink or uplink communication can be scheduled). Examples of unpaired bands include NR operating bands n40, n41, and n50, as specified by 3GPP TS 38.101-1. In some cases, however, using TDD in unpaired spectrum may be inefficient. For example, uplink transmit power may be limited, meaning that UEs may be incapable of transmitting with enough power to efficiently utilize the full bandwidth of an uplink slot. This may be particularly problematic in large cells at the cell edge. Furthermore, using TDD may introduce latency relative to a full-duplexing mode in which uplink communications and downlink communications can be performed in the same time interval, since TDD restricts usage of a given transmission time interval to uplink communication only or downlink communication only. Furthermore, using TDD may reduce spectral efficiency and/or reduce throughput by restricting usage of a given transmission time interval to uplink or downlink communication only.

Accordingly, as shown by example 430, an unpaired band may be configured in an SBFD mode in order to enable half-duplex operation and/or full-duplex operation in unpaired spectrum (e.g., in a TDD band normally limited to half-duplexing only). For example, as shown in FIG. 4, an unpaired band configured in the SBFD mode may include one or more half-duplex transmission time intervals that are associated with downlink communication only or uplink communication only, and one or more full-duplex transmission time intervals in which both downlink communication and uplink communication are enabled. Each transmission time interval may be associated with a control region, illustrated as a portion of a time interval with a diagonal fill for uplink control (e.g., a physical uplink control channel (PUCCH)) or a darker-shaded fill for downlink control (e.g., a physical downlink control channel (PDCCH)). Additionally, or alternatively, each time interval may be associated with a data region, which is shown as a physical downlink shared channel (PDSCH) for downlink frequency regions or a physical uplink shared channel (PUSCH) for uplink frequency regions.

In some aspects, as described herein, an unpaired band configured in the SBFD mode may include one or more full-duplex transmission time intervals (e.g., frames, subframes, slots, and/or symbols, among other examples) that support concurrent or simultaneous communication in downlink and uplink directions. For example, as shown in FIG. 4, a full-duplex transmission time interval may include one or more downlink frequency regions (or sub-bands) and one or more uplink frequency regions (or sub-bands) separated by a guard band that provides isolation between the downlink and uplink resources in the frequency domain in order to mitigate self-interference and/or CLI. Accordingly, an SBFD configuration may divide an unpaired frequency band (e.g., one or more component carriers of an unpaired band) into uplink frequency regions, downlink frequency regions, and/or other regions (e.g., guard bands), which may enable concurrent or simultaneous downlink and uplink operations during one or more transmission time intervals that are divided into downlink and uplink sub-bands. Furthermore, as shown in FIG. 4, the SBFD configuration may include a guard band separation between the downlink and uplink sub-bands to prevent uplink transmission from causing self-interference with respect to downlink reception. Alternatively, in some cases, full-duplex communication may be enabled in an IBFD mode (not shown), where uplink and downlink operation in the same time resource are performed using frequency resources that fully or partially overlap (e.g., relying on spatial isolation between downlink and uplink to mitigate self-interference and/or CLI). In some aspects, an SBFD and/or IBFD configuration may identify bandwidth part configurations corresponding to the uplink frequency regions and the downlink frequency regions. For example, a respective bandwidth part may be configured for each downlink and uplink frequency region.

In some aspects, as described herein, the SBFD slot format shown in example 430 may generally include one or more downlink intervals used for downlink transmissions, one or more uplink intervals used for uplink transmissions, and one or more full-duplex intervals used for downlink and uplink transmissions. For example, in the full-duplex intervals, the downlink transmissions and the uplink transmissions may occur in frequency bands or sub-bands that fully or partially overlap (e.g., in IBFD mode), or the downlink transmissions and the uplink transmissions may occur in adjacent frequency bands or sub-bands that are separated by a guard band (e.g., in SBFD mode). In some aspects, the SBFD slot format may be used to enable full-duplex communication at a base station that communicates with one or more UEs operating in a half-duplexing (e.g., TDD) mode and/or to enable full-duplex communication at a UE communicating with one or more base stations that may be operating in a half-duplexing or a full-duplexing mode. For example, in a given full-duplex interval, a UE operating in a half-duplexing mode may either transmit in the uplink band or receive in the downlink band (e.g., a full-duplexing base station may transmit to a first half-duplexing UE in the downlink band and may receive from a second half-duplexing UE in the uplink band). Additionally, or alternatively, in a given full-duplex interval, a UE operating in a full-duplexing mode may transmit in the uplink band and/or receive in the downlink band.

As indicated above, FIG. 4 is provided as an example. Other examples may differ from what is described with regard to FIG. 4.

Figure 5A:
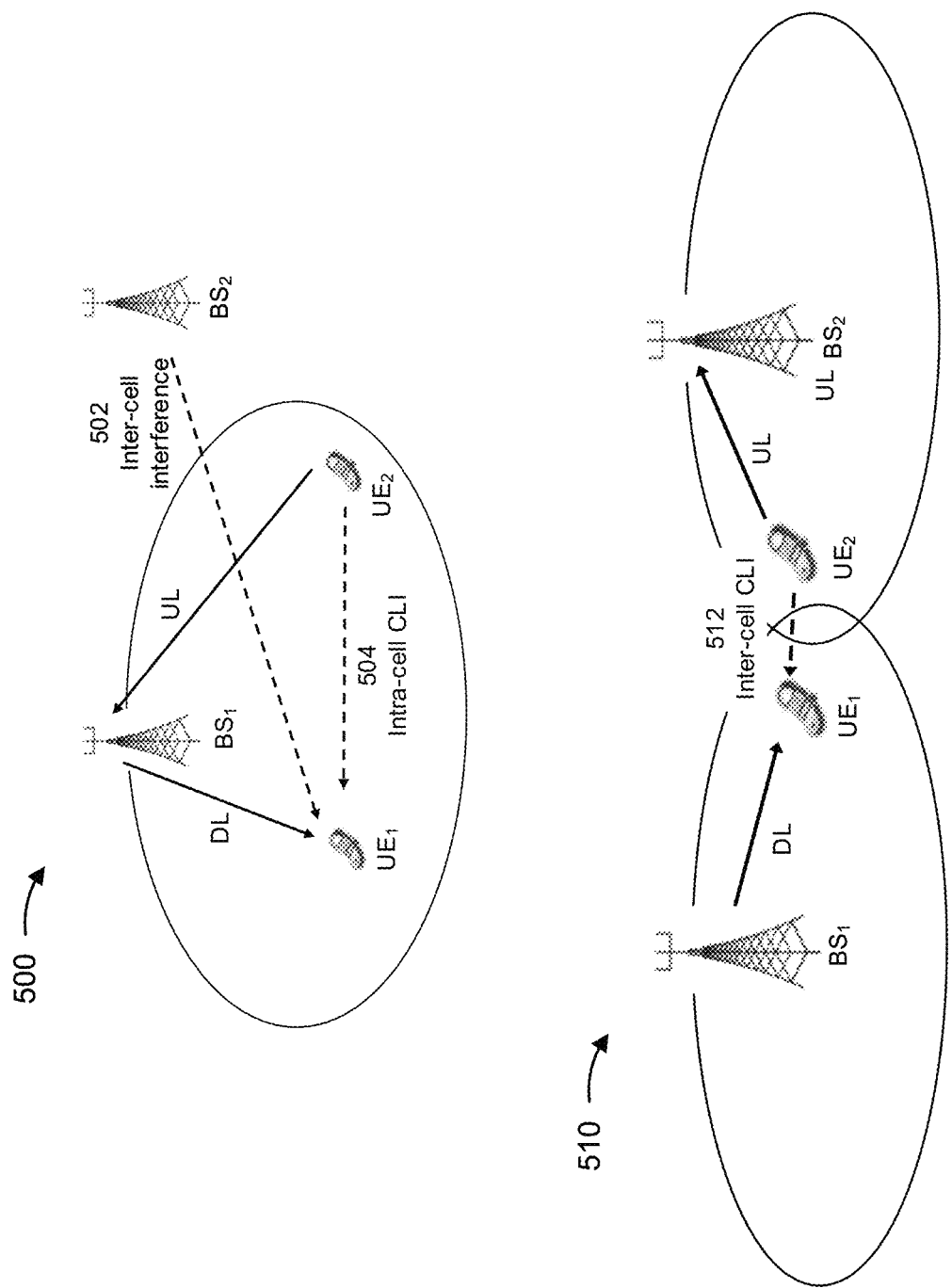
FIGS. 5A-5B are diagrams illustrating examples of interference that may be experienced by a victim UE.
Figure 5B:
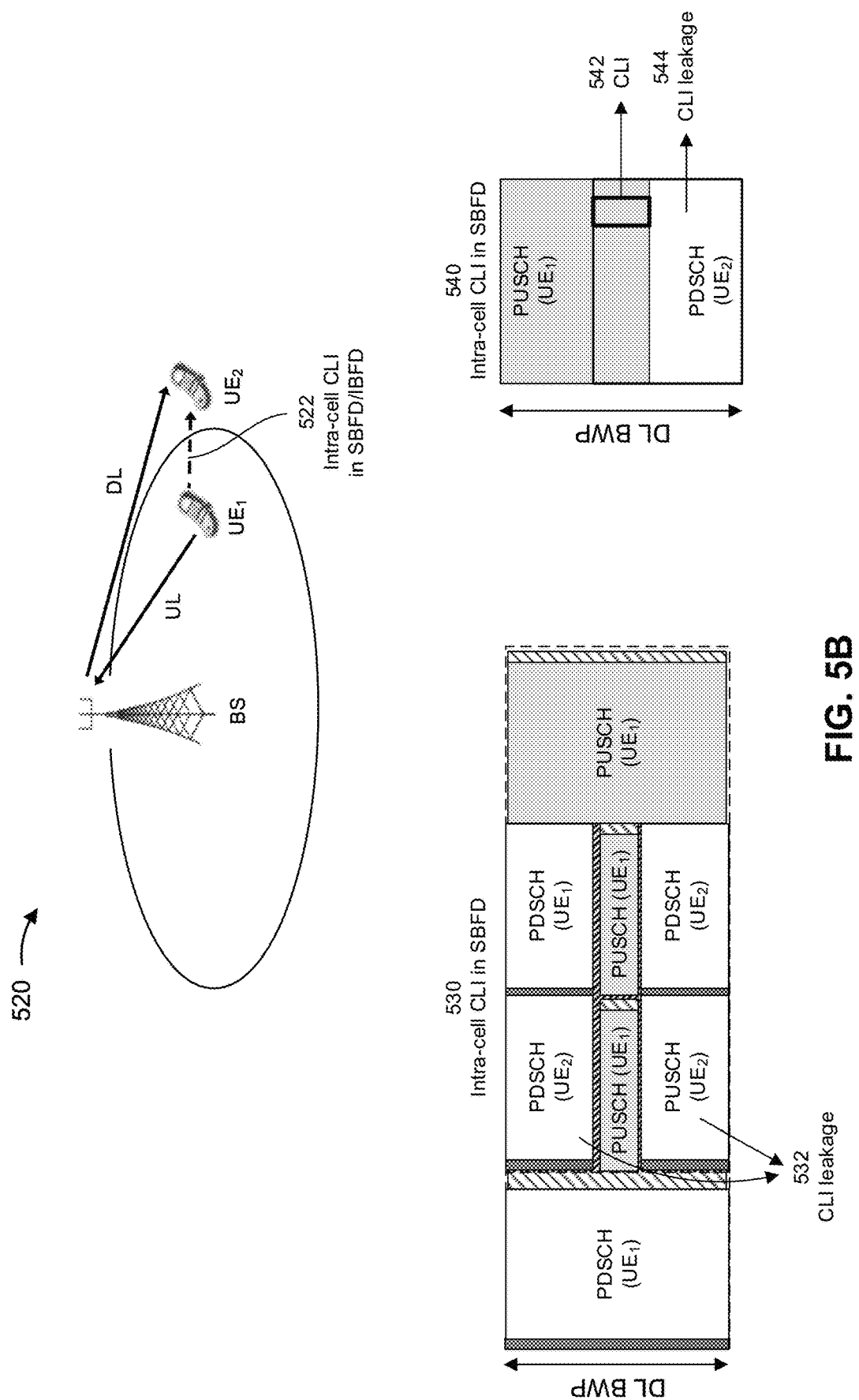

FIGS. 5A-5B are diagrams illustrating examples 500, 510, 520 of interference that may be experienced by a victim UE. For example, a victim UE may experience interference that causes degraded reception performance in various scenarios. For example, a victim UE receiving one or more downlink transmissions from a base station may experience inter-cell CLI caused by downlink transmissions from nearby base stations in different cells, intra-cell CLI caused by uplink transmissions from other UEs in the same cell (e.g., when the base station communicating with the UE is operating in an IBFD mode or an SBFD mode), and/or inter-cell CLI caused by uplink transmissions from other UEs in adjacent cells. For example, the CLI may be experienced at the victim UE when transmissions from nearby base stations and/or nearby UEs are received at the victim UE, which may interfere with reception of the desired downlink transmission(s) at the victim UE. Furthermore, in cases where the victim UE is configured to operate in a full-duplexing mode (e.g., supporting concurrent or simultaneous uplink transmission and downlink reception), the victim UE may experience self-interference due to the uplink transmission leaking into a receive port and/or an object in an environment surrounding the UE reflecting the uplink transmission back to the receive port.

For example, as shown in FIG. 5A, example 500 includes a victim UE (shown as $UE_1$) operating in a half-duplexing mode and communicating with a first base station operating in an IBFD or SBFD mode. For example, as shown by example 500, the first base station may be operating in the IBFD or SBFD mode to support concurrent downlink transmission to the first UE and uplink reception from a second UE (shown as $UE_2$). In example 500, as shown at 502, a first source of interference at the victim UE may be inter-cell CLI caused by downlink transmissions performed by a second base station in a nearby or adjacent cell. Furthermore, as shown at 504, a second source of interference at the victim UE may be intra-cell CLI caused by the uplink transmission from the second UE.

As further shown in FIG. 5A, in example 510, the victim UE (shown as $UE_1$) may be operating in a half-duplexing mode and communicating with a first base station operating in a half-duplexing mode. In this case, however, a second (aggressor) UE (shown as $UE_2$) may be communicating with a second base station in an adjacent cell. In some cases (e.g., the first and second base station are associated with different operators), uplink transmissions in one cell may occur during the same transmission time interval as a downlink transmission in another cell, resulting in inter-cell CLI. For example, as shown at 512, the first UE may receive a downlink transmission from the first base station, and the second UE may concurrently transmit an uplink transmission to the second base station, which may cause CLI interfering with downlink reception at the first UE.

Additionally, or alternatively, as shown in FIG. 5B, in example 520, the victim UE (shown as $UE_2$) may be operating in a half-duplexing mode and communicating with a base station operating in an SBFD or IBFD mode. For example, as shown by example 520, the base station may be operating in the IBFD or SBFD mode to support concurrent downlink transmission to the victim UE and uplink reception from an aggressor UE (shown as $UE_1$). In example 520, as shown at 522, the uplink transmission by the aggressor UE may cause intra-cell CLI that interferes with downlink reception at the victim UE. In particular, in the SBFD mode, the base station may generally schedule a downlink transmission to one UE in frequency domain resources that are adjacent to frequency domain resources configured for uplink transmission by another UE. For example, as shown at 530, the base station may be communicating with the victim UE and the aggressor UE in an SBFD mode, where the aggressor UE ($UE_1$) and the victim UE ($UE_2$) are configured to communicate in opposite directions in a second slot. For example, in the second slot, the aggressor UE is configured to transmit a PUSCH to the base station in the middle of the band configured in the SBFD mode, and the victim UE is configured to receive a PDSCH from the base station in an adjacent frequency resource. In this case, as shown at 532, the PUSCH transmission by the aggressor UE may cause intra-cell CLI that interferes with reception of the concurrent PDSCH by the victim UE. For example, the PUSCH transmission by the aggressor UE may cause the intra-cell CLI due to energy leakage that is caused by timing and frequency misalignment between the victim UE and the aggressor UE and/or due to an automatic gain control (AGC) mismatch (e.g., in cases where the AGC of the victim UE is driven by a downlink serving cell signal of the victim UE but the intra-cell CLI is strong enough to saturate the AGC).

Additionally, or alternatively, as shown at 540, the base station may be communicating with the victim UE and the aggressor UE in an IBFD mode, where the aggressor UE ($UE_1$) is configured to transmit a PUSCH using time and frequency resources that fully or partially overlap with time and frequency resources in which the victim UE ($UE_2$) is configured to receive a PDSCH. For example, in FIG. 5B, the PUSCH transmitted by the aggressor UE spans some time and frequency resources that overlap with time and frequency resources of the PDSCH and some time and frequency resources that do not overlap with time and frequency resources, whereby FIG. 5B illustrates an example IBFD configuration in which there is a partial overlap between uplink time and frequency resources and downlink time and frequency resources. In this case, as shown by 542, intra-cell CLI may occur in the overlapping time and frequency resources. Furthermore, as shown at 544, CLI leakage may occur in the downlink frequency resources that are adjacent to the uplink frequency resources used for the PUSCH. Accordingly, as described herein, intra-cell CLI can limit performance by interfering with downlink reception by one or more UEs (e.g., the intra-cell CLI may include CLI caused by uplink transmissions from nearby UEs in IBFD mode and/or CLI leakage caused by uplink transmissions from nearby UEs in IBFD mode or SBFD mode).

As indicated above, FIGS. 5A-5B are provided as examples. Other examples may differ from what is described with regard to FIGS. 5A-5B.

As described above, there are various scenarios in which a victim UE may experience inter-cell CLI, intra-cell CLI, self-interference, and/or other interference that may degrade downlink reception performance at the victim UE. Accordingly, a base station may configure the victim UE to obtain measurements related to the interference experienced at the victim UE and to report the measurements to the base station (e.g., to enable the base station to select an appropriate downlink beam, resource allocation, and/or other communication parameters to mitigate the interference experienced at the victim UE. For example, a base station may configure the victim UE with a static or semi-static periodic measurement resource using Layer 3 (L3) signaling (e.g., radio resource control (RRC) messages), and the UE may report the interference measurements to the base station using L3 messages. In general, using L3 signaling to configure the periodic measurement resource and to provide the measurement report that includes the interference measurements may provide a low-complexity solution and low control overhead. However, using static or semi-static RRC signaling lacks flexibility and carries a long latency to report CLI and/or self-interference feedback.

For example, a CLI measurement framework based on static or semi-static RRC signaling may generally support RSRP measurements and RSSI measurements using a sounding reference signal (SRS) resource configuration parameter (e.g., SRS-ResourceConfigCLI-r16) to measure an RSRP associated with periodic SRS resources, or an RSSI resource configuration parameter (e.g., RSSI-ResourceConfigCLI-r16) that configures a UE to measure an RSSI based on energy in a given bandwidth. However, in a static or semi-static framework for L3 CLI reporting, a UE is limited to measuring CLI using a beam that has quasi co-location (QCL) type D with respect to a PDSCH receive beam (e.g., the beam used to measure CLI shares a spatial receive parameter with the PDSCH receive beam, as CLI may not be uniform in all directions). Furthermore, static or semi-static L3 CLI reporting is limited to periodic CLI reporting or event-based reporting when CLI measurements derived from an SRS-RSRP measurement or a CLI-RSSI measurement indicate that measured interference exceeds an absolute threshold. Static or semi-static L3 CLI reporting therefore tends to suffer from various limitations due to inflexibility and CLI reporting latency, especially in cases where CLI conditions may be changing dynamically (e.g., based on UE movements, intra-cell CLI that may occur when a base station and/or a nearby UE is communicating in an SBFD or IBFD mode, and/or self-interference that may occur when a UE is communicating in the SBFD or IBFD mode).

Furthermore, although Layer 1 (L1) and/or Layer 2 (L2) CLI reporting may be adaptable to track dynamic changes in interference conditions, L1/L2 signaling is associated with increased control signaling overhead and increased CLI management overhead at the base station. For example, in an L2 CLI framework, a victim UE may be configured with a semi-persistent or periodic CLI measurement resource, and may report CLI measurements using L2 messages (e.g., an uplink medium access control (MAC) control element (MAC-CE)). In another example, in an L1 CLI framework, a victim UE may be configured with an aperiodic, semi-persistent, or periodic CLI measurement resource, and may report CLI measurements using L1 messages (e.g., a PUSCH or a PUCCH). In general, L2 CLI reporting may be more adaptable to dynamic CLI than static or semi-static L3 CLI reporting, and L1 CLI reporting may be more adaptable to dynamic CLI than L2 CLI reporting. However, L2 CLI reporting carries increased control signaling overhead and CLI management overhead at the base station relative to static or semi-static L3 CLI reporting, and L1 CLI reporting carries increased control signaling overhead and CLI management overhead at the base station relative to L2 CLI reporting.

Accordingly, some aspects described herein relate to an adaptive L3 CLI measurement and reporting framework, where L3 messages may include one or more adaptive fields to support flexibility in configuring CLI measurement and/or CLI reporting parameters. In this way, the adaptive L3 CLI measurement and reporting framework may balance tradeoffs between a static or semi-static L3 framework and more dynamic L1/L2 frameworks. For example, by including one or more adaptive fields in the L3 messages used to configure CLI measurements and/or CLI reporting, the adaptive L3 CLI measurement and reporting framework described herein may allow more adaptation to dynamic changes in interference conditions than a static or semi-static L3 CLI framework. Furthermore, by using L3 messages to configure CLI measurement parameters and/or CLI reporting parameters and to carry a CLI report from a victim UE to a base station, the adaptive L3 CLI measurement and reporting framework described herein may be associated with a smaller control signaling overhead and a smaller CLI management overhead relative to dynamic L1/L2 CLI frameworks.

FIG. 6 is a diagram illustrating an example 600 associated with an adaptive cross-link interference measurement and reporting framework. As shown in FIG. 6, example 600 includes communication between a base station 110 and a UE 120. In some aspects, the base station 110 and the UE 120 may be included in a wireless network, such as wireless network 100. The base station 110 and the UE 120 may communicate via a wireless access link, which may include an uplink and a downlink.

In some aspects, as described above in connection with FIG. 3, FIG. 4, and/or FIGS. 5A-5B, the UE 120 may experience various forms of interference, which may include inter-cell CLI caused by downlink transmissions from other base stations, inter-cell CLI caused by uplink transmissions from other UEs in adjacent cells, and/or intra-cell CLI caused by other UEs in the same cell as the UE 120 performing an uplink transmission concurrently or simultaneously with the UE 120 receiving a downlink transmission (e.g., when the base station 110 and/or the other UEs are communicating in an IBFD or SBFD mode). Additionally, or alternatively, in cases where the UE 120 is operating in a full-duplexing mode, such as the IBFD or SBFD mode, the interference experienced at the UE 120 may include self-interference in which an uplink transmission interferes with reception of a concurrent downlink transmission. Accordingly, as described herein, example 600 relates to an adaptive cross-link interference measurement and reporting framework that balances tradeoffs between a static or semi-static L3 CLI framework and more dynamic L1/L2 CLI frameworks to adapt to dynamic changes in interference conditions with a small control signaling overhead.

For example, as shown at 610, the base station 110 may transmit, and the UE 120 may receive, one or more L3 (e.g., RRC) messages to configure periodic measurement resources for L3 CLI reporting. In some aspects, as described herein, the one or more L3 messages may include one or more adaptive CLI measurement fields to indicate one or more adaptable parameters associated with the periodic CLI measurement resources and/or one or more adaptive CLI reporting fields to indicate one or more adaptable parameters associated with an L3 CLI report that the UE 120 transmits to report interference measured at the UE 120. In this way, the adaptive CLI measurement fields and/or the adaptive CLI reporting fields may provide additional flexibility in configuring interference measurements at the UE 120 and/or CLI reporting by the UE 120.

For example, in some aspects, the one or more adaptive CLI measurement fields may include a QCL indication field that indicates a set of QCL Type-D parameters to specify one or more receive beams that may be used for CLI measurement. In this way, the QCL indication field can specify different QCL Type-D parameters to adapt the receive beam used for CLI measurement, rather than relying only on a PDSCH receive beam. Additionally, or alternatively, in some aspects, the one or more adaptive CLI measurement fields may include a sub-band reporting field that indicates a set of sub-band configurations for CLI reporting (e.g., sub-bands that are configured in the IUD mode, the SBFD mode, and/or a half-duplexing mode, among other examples). Additionally, or alternatively, the one or more adaptive CLI measurement fields may include a CLI per QCL Type-D field to enable filtering CLI measurements based on QCL. For example, in some aspects, the CLI per QCL Type-D field may indicate whether the UE 120 is to filter CLI measurements based on the receive beam that is used to obtain the CLI measurements, where the UE 120 may report a CLI measurement using a pairing between a QCL Type-D and a CLI value in cases where the CLI per QCL Type-D field indicates that the UE 120 is to filter CLI measurements based on the receive beam used to obtain the CLI measurements. Additionally, or alternatively, the one or more adaptive CLI measurement fields may include a CLI and self-interference reporting field that indicates whether the periodic CLI measurement resource can be used to measure CLI only or CLI in addition to self-interference (e.g., when the UE 120 is operating in a full-duplexing mode). Accordingly, in some aspects, the one or more adaptive fields may include a filtering field that indicates whether the UE 120 uses one or two filtering processes for CLI and self-interference or CLI only. For example, two filtering processes may be enabled to determine the relative contributions of self-interference and CLI to an overall interference measurement, or one filtering process may be enabled to provide an average interference that does not differentiate the relative contributions of self-interference and CLI to the overall interference measurement.

Furthermore, in some aspects, the one or more L3 messages used to configure adaptive CLI measurement and reporting may include one or more adaptive CLI reporting fields. For example, in some aspects, the one or more adaptive CLI reporting fields may include a field that indicates whether the UE 120 is to report CLI measurements per QCL Type-D (e.g., by pairing a QCL Type-D parameter and a corresponding CLI measurement value) or whether the UE 120 is to report an average CLI measurement over all receive beams. Additionally, or alternatively, the one or more adaptive CLI reporting fields may include a field to indicate whether the UE 120 is to report CLI only or whether the UE 120 is to report self-interference in addition to CLI (e.g., the UE 120 may report both CLI and self-interference in cases where the UE 120 is operating in a full-duplexing mode or has full-duplexing capabilities and the UE 120 is configured with two filtering processes to track CLI measurement values and CLI plus self-interference measurement values). Additionally, or alternatively, the one or more adaptive CLI reporting fields may include one or more fields to define or otherwise configure trigger events for transmitting an L3 CLI report. For example, in some aspects, the trigger event(s) configured by the one or more adaptive CLI reporting fields may configure the UE 120 to transmit an L3 CLI report when an average CLI measurement satisfies (e.g., equals or exceeds) a threshold and/or a CLI associated with a QCL Type-D satisfies (e.g., equals or exceeds) a threshold, among other examples. Additionally, or alternatively, the one or more adaptive CLI reporting fields may configure separate thresholds for measurements that only include CLI and/or measurements that include a combination of CLI and self-interference.

As further shown in FIG. 6, at 620, the base station 110 may transmit, and the UE 120 may receive, one or more L2 messages to select one or more configured values that are indicated in the adaptive CLI measurement and/or reporting fields and/or to activate or deactivate certain adaptive CLI measurement and/or reporting features that are configured in the adaptive CLI measurement and/or reporting fields. For example, as described herein, one or more adaptive CLI measurement fields may configure a set of values for a given CLI measurement parameter, where the configured set may include multiple possible values for the corresponding parameter (e.g., multiple QCL Type-D parameters to indicate different receive beams that may be used for CLI measurement and/or multiple sub-band identifiers to indicate different sub-bands that may be measured for CLI). Accordingly, in some aspects, the one or more L2 messages may include a downlink MAC-CE or another suitable downlink L2 message that selects a particular value in a configured set of values (e.g., a particular QCL Type-D parameter to select the receive beam used for CLI measurement and/or a particular sub-band identifier to select the sub-band to be measured for CLI). Additionally, or alternatively, the one or more adaptive CLI measurement and/or reporting fields may include one or more measurement and/or reporting features that can be activated or deactivated by the one or more L2 messages (e.g., whether to filter CLI measurements based on the receive beam used for CLI measurement, whether to use the periodic CLI measurement resource to measure CLI only or self-interference in addition to CLI, whether to use one or two filtering processes for CLI measurements or CLI measurements in addition to self-interference measurements, and/or whether to activate or deactivate a CLI reporting trigger event).

As further shown in FIG. 6, at 630, the UE 120 may obtain interference measurements based on the adaptively configured CLI measurement and/or CLI reporting parameters. For example, in some aspects, the UE 120 may use the periodic CLI measurement resource(s) configured by the base station 110 to measure inter-cell CLI, intra-cell CLI, and/or self-interference using a receive beam that is configured by an adaptive QCL indication field in an L3 message and/or an L2 message selecting a receive beam configured by an adaptive QCL indication field in an L3 message. Additionally, or alternatively, the UE 120 may be configured to measure one or more sub-bands and/or filter CLI and/or self-interference measurements based on the L3/L2 messages received from the base station 110. Furthermore, in cases where the UE 120 is operating in a full-duplexing mode and is configured to measure and/or report self-interference in addition to CLI, the UE 120 may skip one or more measurement occasions for detecting or measuring self-interference in cases where the UE 120 is not transmitting (e.g., such that there is no self-interference during the skipped measurement occasion(s)).

As further shown in FIG. 6, at 640, the UE 120 may transmit, and the base station 110 may receive, an L3 CLI report transmitted using L3 (e.g., RRC) messages. For example, in some aspects, the L3 CLI report may generally include CLI measurements that are obtained by the UE 120 based on the one or more adaptive CLI measurement and/or adaptive CLI reporting fields included in the L3 messages received from the base station 110. Furthermore, in some aspects, the L3 CLI report may include self-interference measurements obtained by the UE 120 in cases where the L3/L2 messages received from the base station 110 configure the UE 120 to measure, filter, and/or report self-interference measurements in addition to the CLI measurements. In some aspects, the L3 CLI report may be transmitted at periodic intervals, or the L3 CLI report may be transmitted based on the UE 120 determining that a trigger event is satisfied. For example, in some aspects, the trigger event may be satisfied when an interference measurement satisfies an absolute threshold, or the trigger event that causes the UE 120 to transmit the L3 CLI report may be configured based on the L3/L2 messages received from the base station 110 (e.g., based on the average CLI measured at the UE 120 satisfying a threshold and/or a CLI per QCL Type-D satisfying a threshold).

As further shown in FIG. 6, at 650, the base station 110 may transmit, and the UE 120 may receive, one or more L2 messages to adapt the CLI measurement parameters and/or the CLI reporting parameters. For example, in some aspects, a wireless network may support a maximum number of measurement resources that can be monitored by the UE 120, and the UE 120 may transmit information to the base station 110 to indicate the capability of the UE 120 (e.g., a capability to monitor up to four (4) CLI-SRS resource configurations). Accordingly, in order to adapt the active measurement resources at the UE 120, the UE 120 may transmit information to the base station 110 to indicate a capability related to a maximum number of CLI measurement resource configurations supported by the UE 120, and the base station 110 may transmit a downlink L2 message (e.g., a downlink MAC-CE) to activate a subset of CLI measurement resource configurations based on the capability of the UE 120. For example, in some aspects, the capability information transmitted by the UE 120 may indicate the maximum number of CLI measurement resource configurations supported by the UE 120 and/or a maximum number of active CLI measurement resources supported by the UE 120. Furthermore, in some aspects, similar techniques may be used to adapt any other suitable CLI measurement and/or CLI reporting parameter. For example, in some aspects, the downlink L2 message(s) may be used to update one or more previously configured CLI measurement and/or CLI reporting parameters (e.g., activating a particular QCL Type-D or sub-band for CLI measurement, activating or deactivating CLI per QCL Type-D reporting, and/or activating or deactivating one or more CLI report trigger events, among other examples). In this way, the base station 110 may dynamically adapt the CLI measurement and/or CLI reporting configuration used at the UE 120 based on dynamic changes in inter-cell CLI, intra-cell CLI, and/or self-interference, among other examples.

As indicated above, FIG. 6 is provided as an example. Other examples may differ from what is described with regard to FIG. 6.

Figure 7:
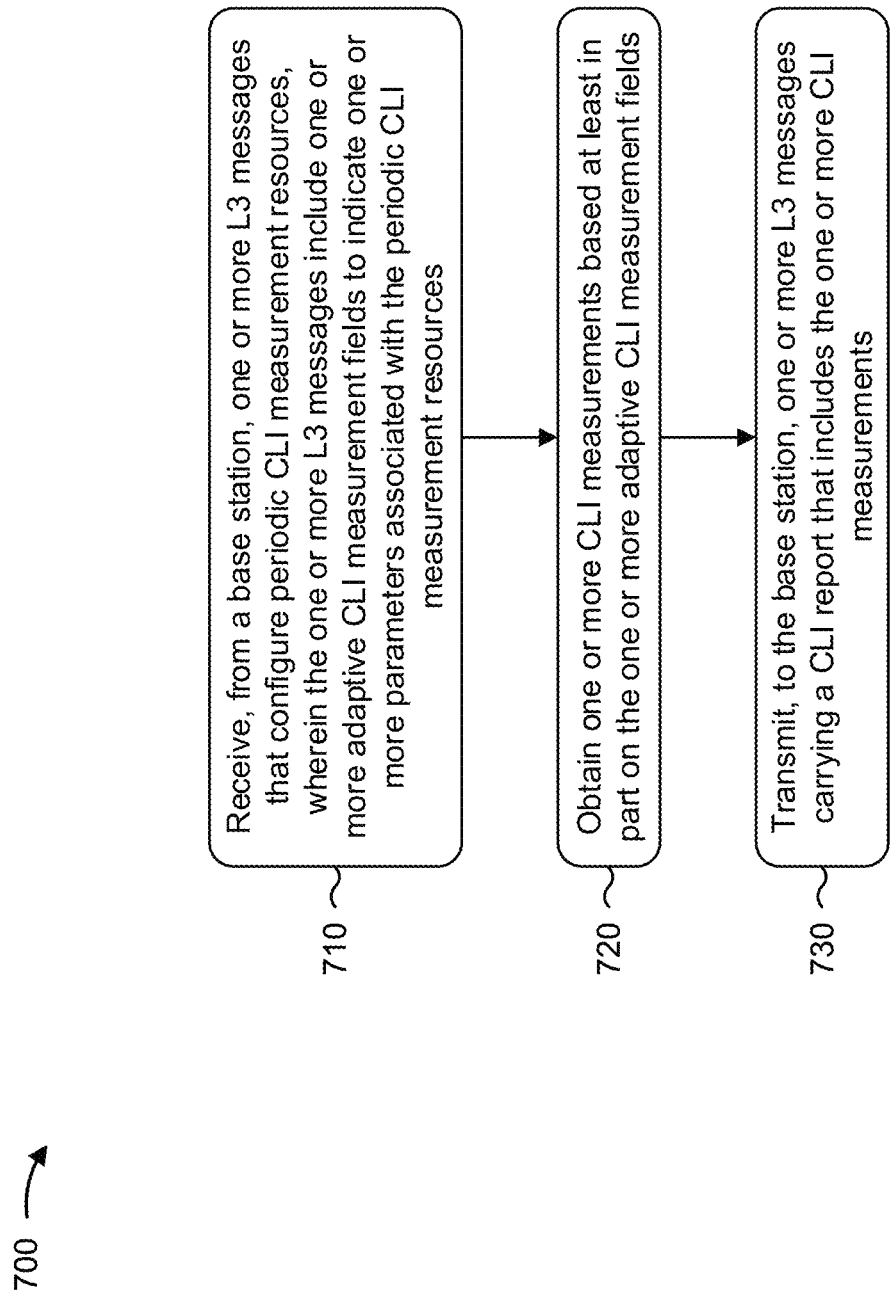
FIGS. 7-8 are flowcharts of example methods of wireless communication.

FIG. 7 is a flowchart of an example method 700 of wireless communication. The method 700 may be performed by, for example, a UE (e.g., UE 120).

At 710, the UE may receive, from a base station, one or more L3 messages that configure periodic CLI measurement resources, wherein the one or more L3 messages include one or more adaptive CLI measurement fields to indicate one or more parameters associated with the periodic CLI measurement resources. For example, the UE (e.g., using communication manager 140 and/or reception component 902, depicted in FIG. 9) may receive, from a base station, one or more L3 messages that configure periodic CLI measurement resources, wherein the one or more L3 messages include one or more adaptive CLI measurement fields to indicate one or more parameters associated with the periodic CLI measurement resources, as described above in connection with, for example, FIG. 6 at 610. In some aspects, the one or more adaptive CLI measurement fields indicate one or more receive beams to use to obtain the one or more CLI measurements. In some aspects, the one or more adaptive CLI measurement fields indicate one or more sub-bands included in the periodic CLI measurement resources. In some aspects, the one or more adaptive CLI measurement fields indicate whether the periodic CLI measurement resources support measuring self-interference associated with a full-duplex communication mode. In some aspects, the one or more adaptive CLI measurement fields indicate a number of filtering processes to apply to the one or more CLI measurements. In some aspects, the one or more adaptive CLI measurement fields include at least one field that configures multiple options for a CLI measurement parameter, and method 700 further comprises receiving, from the base station, a downlink L2 message to select one of the multiple options configured in the at least one field for the CLI measurement parameter.

At 720, the UE may obtain one or more CLI measurements based at least in part on the one or more adaptive CLI measurement fields. For example, the UE (e.g., using communication manager 140 and/or CLI measurement component 908, depicted in FIG. 9) may obtain one or more CLI measurements based at least in part on the one or more adaptive CLI measurement fields, as described above in connection with, for example, FIG. 6 at 630. In some aspects, method 700 includes receiving, from the base station, a downlink L2 message to activate or deactivate a CLI measurement parameter indicated in the one or more adaptive CLI measurement fields. In some aspects, the one or more L3 messages include one or more adaptive CLI reporting fields to indicate one or more parameters associated with the CLI report. In some aspects, the one or more adaptive CLI reporting fields indicate whether to report the one or more CLI measurements per receive beam or as an average over all receive beams. In some aspects, the one or more adaptive CLI reporting fields indicate whether to include one or more self-interference measurements in the CLI report. In some aspects, the one or more adaptive CLI reporting fields indicate one or more events to trigger transmission of the CLI report.

At 730, the UE may transmit, to the base station, one or more L3 messages carrying a CLI report that includes the one or more CLI measurements. For example, the UE (e.g., using communication manager 140 and/or transmission component 904, depicted in FIG. 9) may transmit, to the base station, one or more L3 messages carrying a CLI report that includes the one or more CLI measurements, as described above in connection with, for example, FIG. 6 at 640.

In some aspects, method 700 includes transmitting, to the base station, information that indicates a capability related to a maximum number of CLI measurement resource configurations supported by the UE, and receiving, from the base station, an L2 message that activates a subset of CLI measurement resources configured for the UE based at least in part on the capability related to the maximum number of CLI measurement resource configurations supported by the UE. In some aspects, the capability transmitted to the base station indicates the maximum number of CLI measurement resource configurations supported by the UE. In some aspects, the capability transmitted to the base station indicates a maximum number of active CLI measurement resources supported by the UE.

Although FIG. 7 shows example blocks of method 700, in some aspects, method 700 may include additional blocks, fewer blocks, different blocks, or differently arranged blocks than those depicted in FIG. 7. Additionally, or alternatively, two or more of the blocks of method 700 may be performed in parallel.

Figure 8:
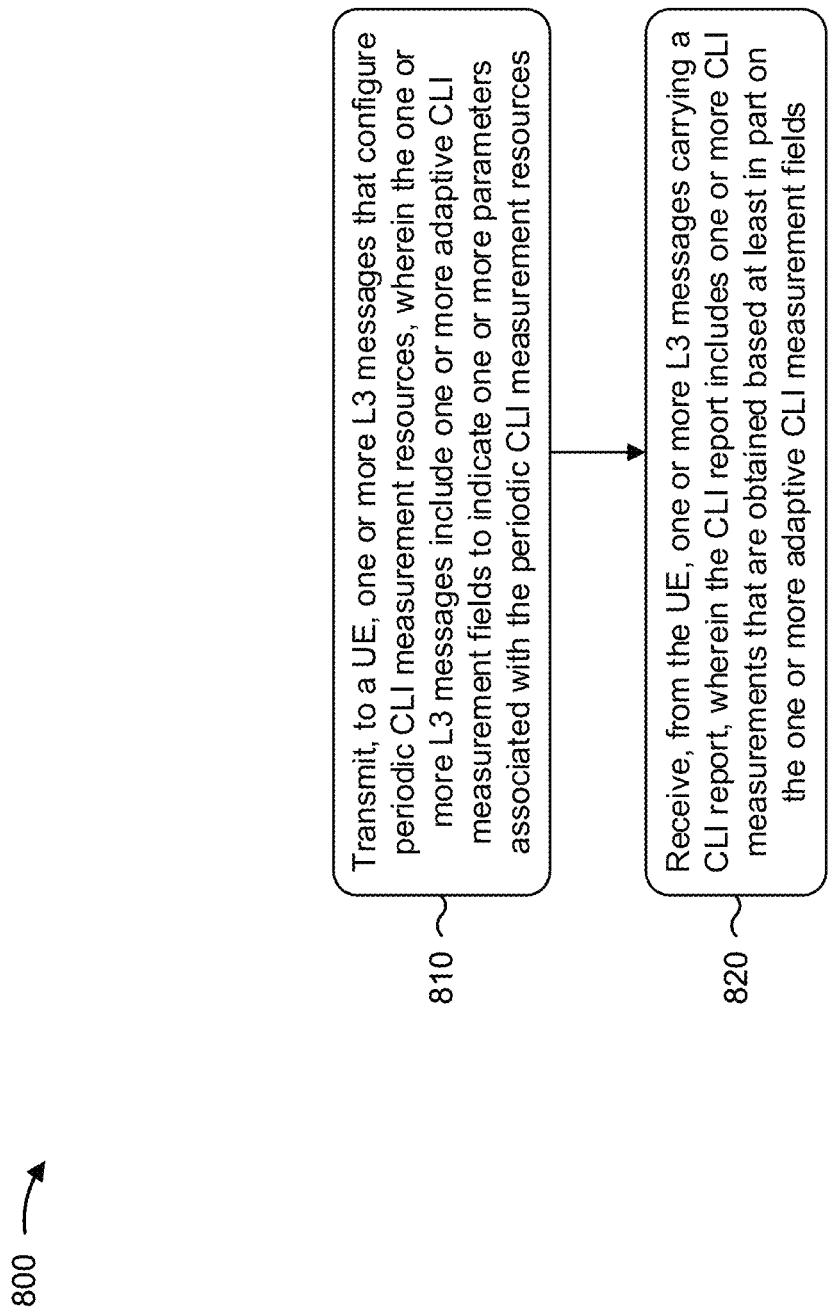

FIG. 8 is a flowchart of an example method 800 of wireless communication. The method 800 may be performed by, for example, a base station (e.g., base station 110).

At 810, the base station may transmit, to a UE, one or more L3 messages that configure periodic CLI measurement resources, wherein the one or more L3 messages include one or more adaptive CLI measurement fields to indicate one or more parameters associated with the periodic CLI measurement resources. For example, the base station (e.g., using communication manager 150 and/or transmission component 1104, depicted in FIG. 11) may transmit, to a UE, one or more L3 messages that configure periodic CLI measurement resources, wherein the one or more L3 messages include one or more adaptive CLI measurement fields to indicate one or more parameters associated with the periodic CLI measurement resources, as described above in connection with, for example, FIG. 6 at 610. In some aspects, the one or more adaptive CLI measurement fields indicate one or more receive beams that the UE is to use to obtain the one or more CLI measurements. In some aspects, the one or more adaptive CLI measurement fields indicate one or more sub-bands included in the periodic CLI measurement resources. In some aspects, the one or more adaptive CLI measurement fields indicate whether the periodic CLI measurement resources support measuring self-interference associated with a full-duplex communication mode. In some aspects, the one or more adaptive CLI measurement fields indicate a number of filtering processes that the UE is to apply to the one or more CLI measurement. In some aspects, the one or more adaptive CLI measurement fields include at least one field that configures multiple options for a CLI measurement parameter, and method 800 further comprises transmitting, to the UE, a downlink L2 message to select one of the multiple options configured in the at least one field for the CLI measurement parameter. In some aspects, method 800 includes transmitting, to the UE, a downlink L2 message to activate or deactivate a CLI measurement parameter indicated in the one or more adaptive CLI measurement fields.

At 820, the base station may receive, from the UE, one or more L3 messages carrying a CLI report, wherein the CLI report includes one or more CLI measurements that are obtained based at least in part on the one or more adaptive CLI measurement fields. For example, the base station (e.g., using communication manager 150 and/or reception component 1102, depicted in FIG. 11) may receive, from the UE, one or more L3 messages carrying a CLI report, wherein the CLI report includes one or more CLI measurements that are obtained based at least in part on the one or more adaptive CLI measurement fields, as described above in connection with, for example, FIG. 6 at 640. In some aspects, the one or more L3 messages include one or more adaptive CLI reporting fields to indicate one or more parameters associated with the CLI report. In some aspects, the one or more adaptive CLI reporting fields indicate whether to report the one or more CLI measurements per receive beam or as an average over all receive beams. In some aspects, the one or more adaptive CLI reporting fields indicate whether the UE is to include one or more self-interference measurements in the CLI report. In some aspects, the one or more adaptive CLI reporting fields indicate one or more events to trigger transmission of the CLI report.

In some aspects, method 800 includes receiving, from the UE, information that indicates a capability related to a maximum number of CLI measurement resource configurations supported by the UE, and transmitting, to the UE, an L2 message that activates a subset of CLI measurement resources configured for the UE based at least in part on the capability related to the maximum number of CLI measurement resource configurations supported by the UE. In some aspects, the capability received from the UE indicates the maximum number of CLI measurement resource configurations supported by the UE. In some aspects, the capability received from the UE indicates a maximum number of active CLI measurement resources supported by the UE.

Although FIG. 8 shows example blocks of method 800, in some aspects, method 800 may include additional blocks, fewer blocks, different blocks, or differently arranged blocks than those depicted in FIG. 8. Additionally, or alternatively, two or more of the blocks of method 800 may be performed in parallel.

Figure 9:
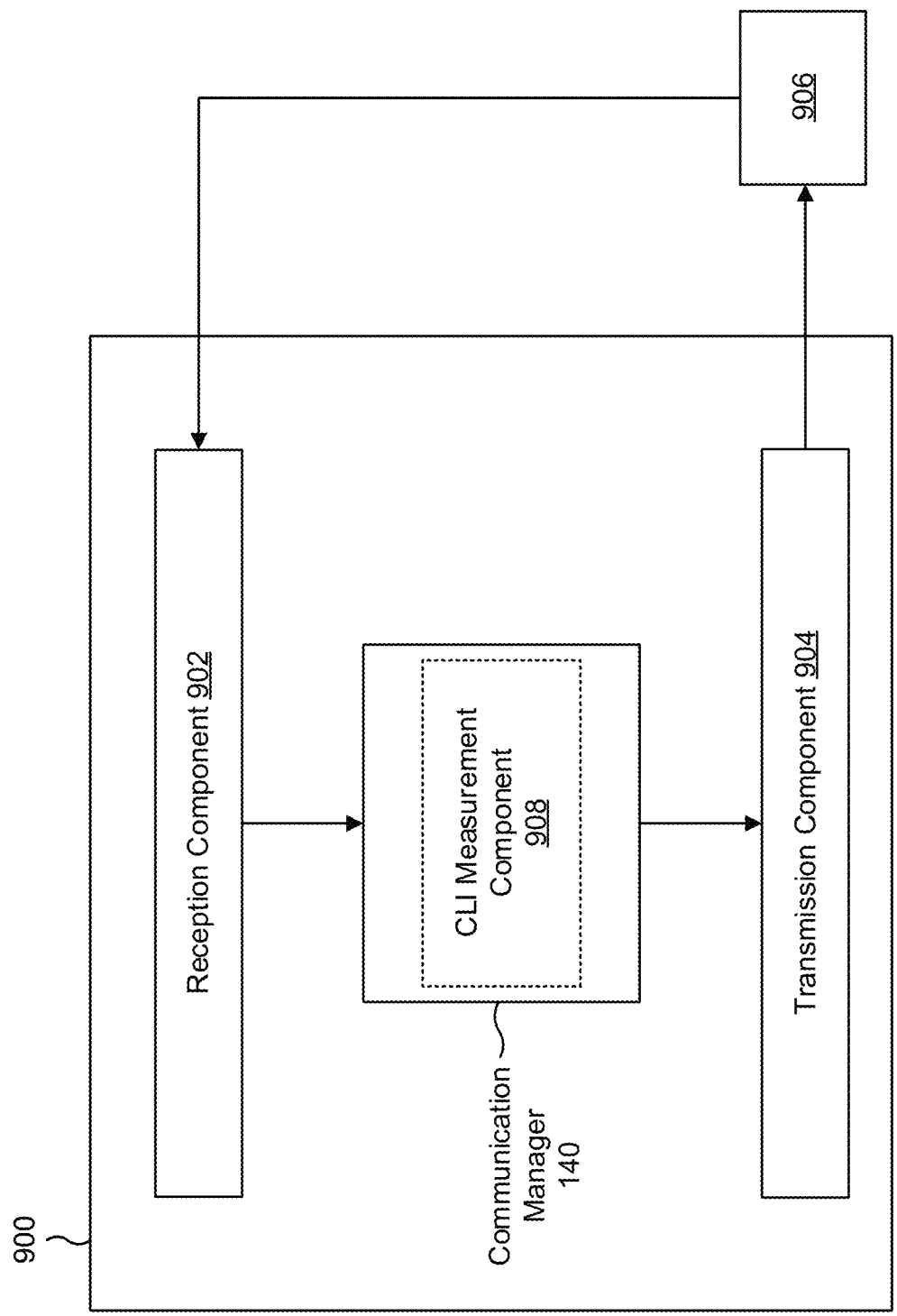
FIG. 9 is a diagram of an example apparatus for wireless communication.

FIG. 9 is a diagram of an example apparatus 900 for wireless communication. The apparatus 900 may be a UE, or a UE may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include the communication manager 140. The communication manager 140 may include a CLI measurement component 908, among other examples.

In some aspects, the apparatus 900 may be configured to perform one or more operations described herein in connection with FIG. 6. Additionally, or alternatively, the apparatus 900 may be configured to perform one or more methods described herein, such as method 700 of FIG. 7. In some aspects, the apparatus 900 and/or one or more components shown in FIG. 9 may include one or more components of the UE described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a modem, a demodulator, a MIMO detector, a receive processor, a controller/processor, a memory, or a combination thereof, of the UE described in connection with FIG. 2.

The transmission component 904 may transmit communications, such as reference signals, control information, data communications, or a combination thereof, to the apparatus 906. In some aspects, one or more other components of the apparatus 900 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, a memory, or a combination thereof, of the UE described in connection with FIG. 2. In some aspects, the transmission component 904 may be co-located with the reception component 902 in a transceiver.

The reception component 902 may receive, from a base station, one or more L3 messages that configure periodic CLI measurement resources, wherein the one or more L3 messages include one or more adaptive CLI measurement fields to indicate one or more parameters associated with the periodic CLI measurement resources. The CLI measurement component 908 may obtain one or more CLI measurements based at least in part on the one or more adaptive CLI measurement fields. The transmission component 904 may transmit, to the base station, one or more L3 messages carrying a CLI report that includes the one or more CLI measurements.

The reception component 902 may receive, from the base station, a downlink L2 message to activate or deactivate a CLI measurement parameter indicated in the one or more adaptive CLI measurement fields.

The transmission component 904 may transmit, to the base station, information that indicates a capability related to a maximum number of CLI measurement resource configurations supported by the UE. The reception component 902 may receive, from the base station, an L2 message that activates a subset of CLI measurement resources configured for the UE based at least in part on the capability related to the maximum number of CLI measurement resource configurations supported by the UE.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

Figure 10:
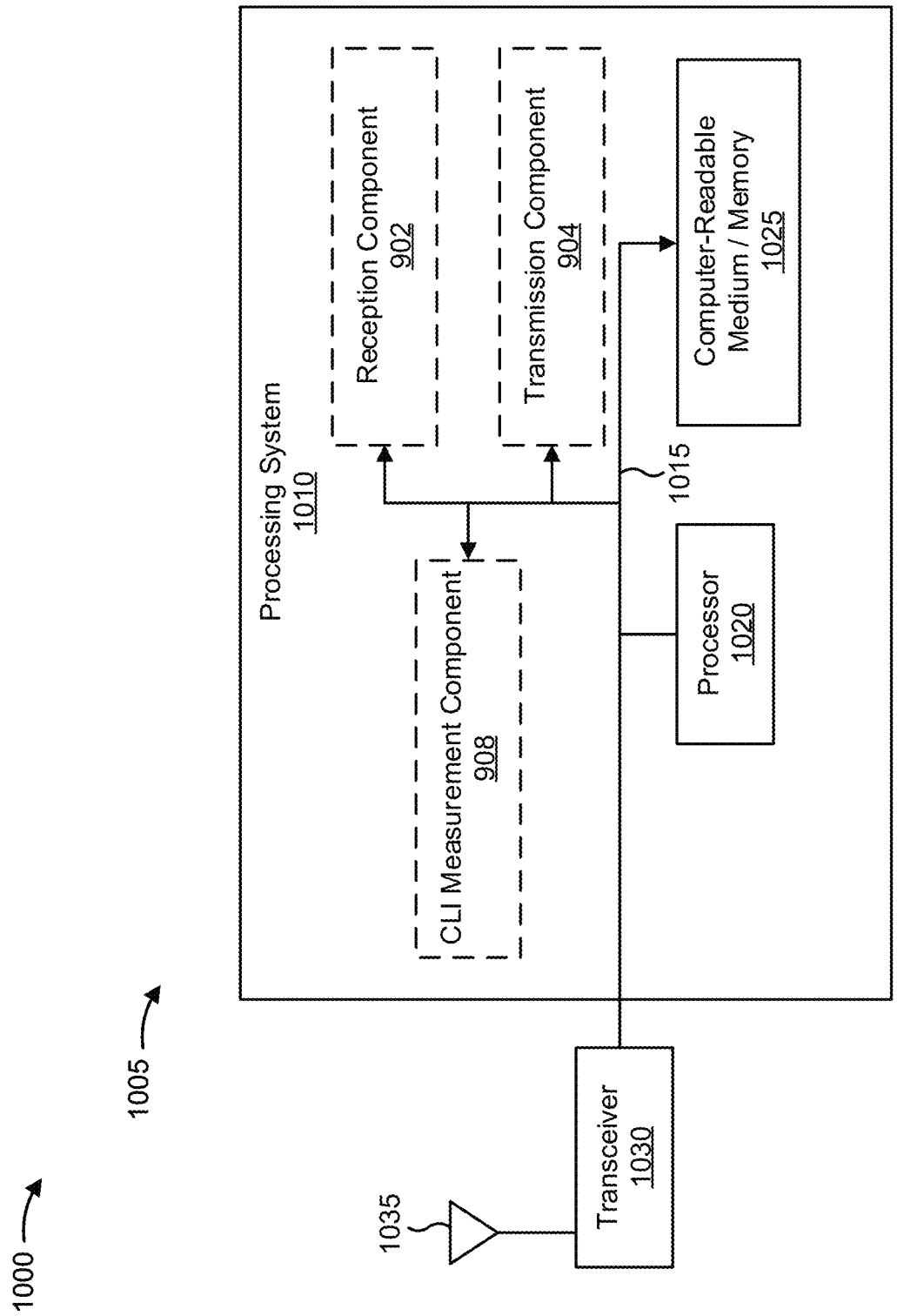
FIG. 10 is a diagram illustrating an example of a hardware implementation for an apparatus employing a processing system.

FIG. 10 is a diagram illustrating an example 1000 of a hardware implementation for an apparatus 1005 employing a processing system 1010. The apparatus 1005 may be a UE.

The processing system 1010 may be implemented with a bus architecture, represented generally by the bus 1015. The bus 1015 may include any number of interconnecting buses and bridges depending on the specific application of the processing system 1010 and the overall design constraints. The bus 1015 links together various circuits including one or more processors and/or hardware components, represented by the processor 1020, the illustrated components, and the computer-readable medium/memory 1025. The bus 1015 may also link various other circuits, such as timing sources, peripherals, voltage regulators, and/or power management circuits.

The processing system 1010 may be coupled to a transceiver 1030. The transceiver 1030 is coupled to one or more antennas 1035. The transceiver 1030 provides a means for communicating with various other apparatuses over a transmission medium. The transceiver 1030 receives a signal from the one or more antennas 1035, extracts information from the received signal, and provides the extracted information to the processing system 1010, specifically the reception component 902. In addition, the transceiver 1030 receives information from the processing system 1010, specifically the transmission component 904, and generates a signal to be applied to the one or more antennas 1035 based at least in part on the received information.

The processing system 1010 includes a processor 1020 coupled to a computer-readable medium/memory 1025. The processor 1020 is responsible for general processing, including the execution of software stored on the computer-readable medium/memory 1025. The software, when executed by the processor 1020, causes the processing system 1010 to perform the various functions described herein for any particular apparatus. The computer-readable medium/memory 1025 may also be used for storing data that is manipulated by the processor 1020 when executing software. The processing system further includes at least one of the illustrated components. The components may be software modules running in the processor 1020, resident/stored in the computer readable medium/memory 1025, one or more hardware modules coupled to the processor 1020, or some combination thereof.

In some aspects, the processing system 1010 may be a component of the UE 120 and may include the memory 282 and/or at least one of the TX MIMO processor 266, the RX processor 258, and/or the controller/processor 280. In some aspects, the apparatus 1005 for wireless communication includes means for receiving, from a base station, one or more L3 messages that configure periodic CLI measurement resources, wherein the one or more L3 messages include one or more adaptive CLI measurement fields to indicate one or more parameters associated with the periodic CLI measurement resources; means for obtaining one or more CLI measurements based at least in part on the one or more adaptive CLI measurement fields; and/or means for transmitting, to the base station, one or more L3 messages carrying a CLI report that includes the one or more CLI measurements. The aforementioned means may be one or more of the aforementioned components of the apparatus 900 and/or the processing system 1010 of the apparatus 1005 configured to perform the functions recited by the aforementioned means. As described elsewhere herein, the processing system 1010 may include the TX MIMO processor 266, the RX processor 258, and/or the controller/processor 280. In one configuration, the aforementioned means may be the TX MIMO processor 266, the RX processor 258, and/or the controller/processor 280 configured to perform the functions and/or operations recited herein.

FIG. 10 is provided as an example. Other examples may differ from what is described in connection with FIG. 10.

Figure 11:
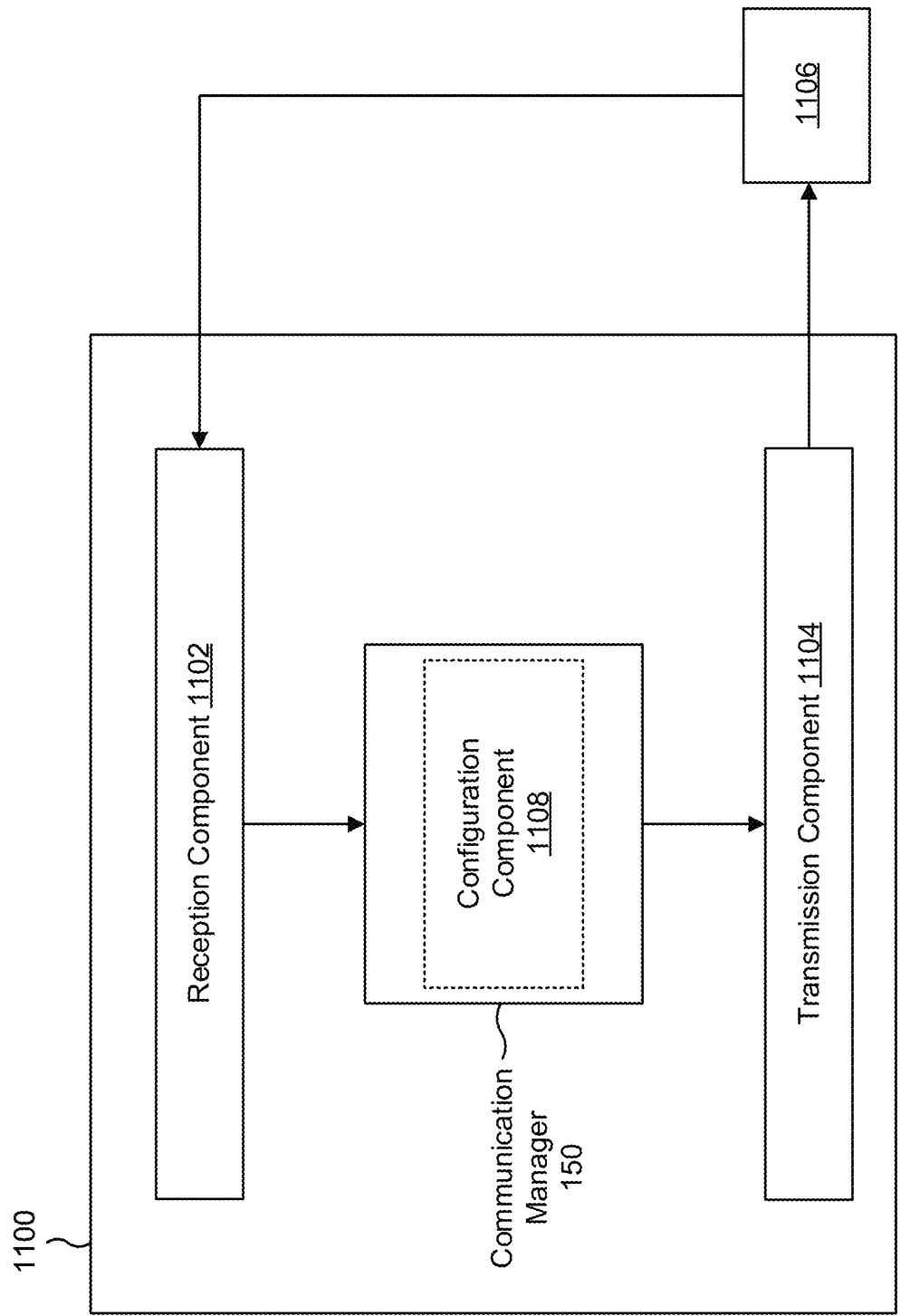
FIG. 11 is a diagram of an example apparatus for wireless communication.

FIG. 11 is a diagram of an example apparatus 1100 for wireless communication. The apparatus 1100 may be a base station, or a base station may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include the communication manager 150. The communication manager 150 may include a configuration component 1108, among other examples.

In some aspects, the apparatus 1100 may be configured to perform one or more operations described herein in connection with FIG. 6. Additionally, or alternatively, the apparatus 1100 may be configured to perform one or more methods described herein, such as method 800 of FIG. 8. In some aspects, the apparatus 1100 and/or one or more components shown in FIG. 11 may include one or more components of the base station described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a modem, a demodulator, a MIMO detector, a receive processor, a controller/processor, a memory, or a combination thereof, of the base station described in connection with FIG. 2.

The transmission component 1104 may transmit communications, such as reference signals, control information, data communications, or a combination thereof, to the apparatus 1106. In some aspects, one or more other components of the apparatus 1100 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modem, a modulator, a transmit MIMO processor, a transmit processor, a controller/processor, a memory, or a combination thereof, of the base station described in connection with FIG. 2. In some aspects, the transmission component 1104 may be co-located with the reception component 1102 in a transceiver.

The configuration component 1108 may determine periodic CLI measurement resources to configure for a UE. The transmission component 1104 may transmit, to the UE, one or more L3 messages that configure the periodic CLI measurement resources, wherein the one or more L3 messages include one or more adaptive CLI measurement fields to indicate one or more parameters associated with the periodic CLI measurement resources. The reception component 1102 may receive, from the UE, one or more L3 messages carrying a CLI report, wherein the CLI report includes one or more CLI measurements that are obtained based at least in part on the one or more adaptive CLI measurement fields.

The transmission component 1104 may transmit, to the UE, a downlink L2 message to activate or deactivate a CLI measurement parameter indicated in the one or more adaptive CLI measurement fields.

The reception component 1102 may receive, from the UE, information that indicates a capability related to a maximum number of CLI measurement resource configurations supported by the UE. The transmission component 1104 may transmit, to the UE, an L2 message that activates a subset of CLI measurement resources configured for the UE based at least in part on the capability related to the maximum number of CLI measurement resource configurations supported by the UE.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

Figure 12:
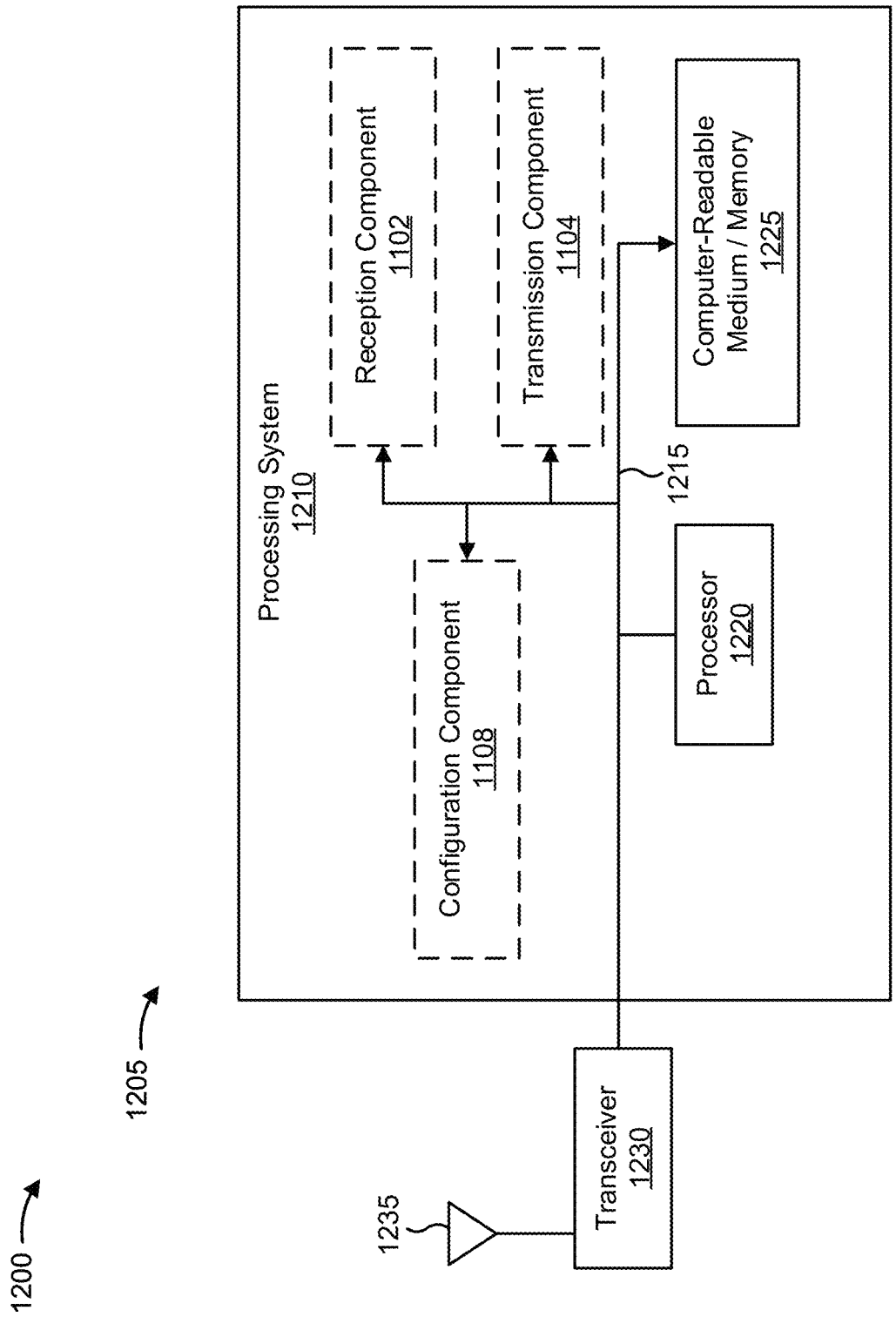
FIG. 12 is a diagram illustrating an example of a hardware implementation for an apparatus employing a processing system.

FIG. 12 is a diagram illustrating an example 1200 of a hardware implementation for an apparatus 1205 employing a processing system 1210. The apparatus 1205 may be a base station.

The processing system 1210 may be implemented with a bus architecture, represented generally by the bus 1215. The bus 1215 may include any number of interconnecting buses and bridges depending on the specific application of the processing system 1210 and the overall design constraints. The bus 1215 links together various circuits including one or more processors and/or hardware components, represented by the processor 1220, the illustrated components, and the computer-readable medium/memory 1225. The bus 1215 may also link various other circuits, such as timing sources, peripherals, voltage regulators, and/or power management circuits.

The processing system 1210 may be coupled to a transceiver 1230. The transceiver 1230 is coupled to one or more antennas 1235. The transceiver 1230 provides a means for communicating with various other apparatuses over a transmission medium. The transceiver 1230 receives a signal from the one or more antennas 1235, extracts information from the received signal, and provides the extracted information to the processing system 1210, specifically the reception component 1102. In addition, the transceiver 1230 receives information from the processing system 1210, specifically the transmission component 1104, and generates a signal to be applied to the one or more antennas 1235 based at least in part on the received information.

The processing system 1210 includes a processor 1220 coupled to a computer-readable medium/memory 1225. The processor 1220 is responsible for general processing, including the execution of software stored on the computer-readable medium/memory 1225. The software, when executed by the processor 1220, causes the processing system 1210 to perform the various functions described herein for any particular apparatus. The computer-readable medium/memory 1225 may also be used for storing data that is manipulated by the processor 1220 when executing software. The processing system further includes at least one of the illustrated components. The components may be software modules running in the processor 1220, resident/stored in the computer readable medium/memory 1225, one or more hardware modules coupled to the processor 1220, or some combination thereof.

In some aspects, the processing system 1210 may be a component of the base station 110 and may include the memory 242 and/or at least one of the TX MIMO processor 230, the RX processor 238, and/or the controller/processor 240. In some aspects, the apparatus 1205 for wireless communication includes means for transmitting, to a UE, one or more L3 messages that configure periodic CLI measurement resources, wherein the one or more L3 messages include one or more adaptive CLI measurement fields to indicate one or more parameters associated with the periodic CLI measurement resources; and/or means for receiving, from the UE, one or more L3 messages carrying a CLI report, wherein the CLI report includes one or more CLI measurements that are obtained based at least in part on the one or more adaptive CLI measurement fields. The aforementioned means may be one or more of the aforementioned components of the apparatus 1100 and/or the processing system 1210 of the apparatus 1205 configured to perform the functions recited by the aforementioned means. As described elsewhere herein, the processing system 1210 may include the TX MIMO processor 230, the receive processor 238, and/or the controller/processor 240. In one configuration, the aforementioned means may be the TX MIMO processor 230, the receive processor 238, and/or the controller/processor 240 configured to perform the functions and/or operations recited herein.

FIG. 12 is provided as an example. Other examples may differ from what is described in connection with FIG. 12.

The following provides an overview of some Aspects of the present disclosure:

Aspect 1: A method of wireless communication performed by a UE, comprising: receiving, from a base station, one or more L3 messages that configure periodic CLI measurement resources, wherein the one or more L3 messages include one or more adaptive CLI measurement fields to indicate one or more parameters associated with the periodic CLI measurement resources; obtaining one or more CLI measurements based at least in part on the one or more adaptive CLI measurement fields; and transmitting, to the base station, one or more L3 messages carrying a CLI report that includes the one or more CLI measurements.

Aspect 2: The method of Aspect 1, wherein the one or more adaptive CLI measurement fields indicate one or more receive beams to use to obtain the one or more CLI measurements.

Aspect 3: The method of any of Aspects 1-2, wherein the one or more adaptive CLI measurement fields indicate one or more sub-bands included in the periodic CLI measurement resources.

Aspect 4: The method of any of Aspects 1-3, wherein the one or more adaptive CLI measurement fields indicate whether the periodic CLI measurement resources support measuring self-interference associated with a full-duplex communication mode.

Aspect 5: The method of any of Aspects 1-4, wherein the one or more adaptive CLI measurement fields indicate a number of filtering processes to apply to the one or more CLI measurement.

Aspect 6: The method of any of Aspects 1-5, wherein the one or more adaptive CLI measurement fields include at least one field that configures multiple options for a CLI measurement parameter, and wherein the method further comprises: receiving, from the base station, a downlink L2 message to select one of the multiple options configured in the at least one field for the CLI measurement parameter.

Aspect 7: The method of any of Aspects 1-6, further comprising: receiving, from the base station, a downlink L2 message to activate or deactivate a CLI measurement parameter indicated in the one or more adaptive CLI measurement fields.

Aspect 8: The method of any of Aspects 1-7, wherein the one or more L3 messages include one or more adaptive CLI reporting fields to indicate one or more parameters associated with the CLI report.

Aspect 9: The method of Aspect 8, wherein the one or more adaptive CLI reporting fields indicate whether to report the one or more CLI measurements per receive beam or as an average over all receive beams.

Aspect 10: The method of any of Aspects 8-9, wherein the one or more adaptive CLI reporting fields indicate whether to include one or more self-interference measurements in the CLI report.

Aspect 11: The method of any of Aspects 8-10, wherein the one or more adaptive CLI reporting fields indicate one or more events to trigger transmission of the CLI report.

Aspect 12: The method of any of Aspects 1-11, further comprising: transmitting, to the base station, information that indicates a capability related to a maximum number of CLI measurement resource configurations supported by the UE; and receiving, from the base station, an L2 message that activates a subset of CLI measurement resources configured for the UE based at least in part on the capability related to the maximum number of CLI measurement resource configurations supported by the UE.

Aspect 13: The method of Aspect 12, wherein the capability transmitted to the base station indicates the maximum number of CLI measurement resource configurations supported by the UE.

Aspect 14: The method of any of Aspects 12-13, wherein the capability transmitted to the base station indicates a maximum number of active CLI measurement resources supported by the UE.

Aspect 15: A method of wireless communication performed by a base station, comprising: transmitting, to a UE, one or more L3 messages that configure periodic CLI measurement resources, wherein the one or more L3 messages include one or more adaptive CLI measurement fields to indicate one or more parameters associated with the periodic CLI measurement resources; and receiving, from the UE, one or more L3 messages carrying a CLI report, wherein the CLI report includes one or more CLI measurements that are obtained based at least in part on the one or more adaptive CLI measurement fields.

Aspect 16: The method of Aspect 15, wherein the one or more adaptive CLI measurement fields indicate one or more receive beams that the UE is to use to obtain the one or more CLI measurements.

Aspect 17: The method of any of Aspects 15-16, wherein the one or more adaptive CLI measurement fields indicate one or more sub-bands included in the periodic CLI measurement resources.

Aspect 18: The method of any of Aspects 15-17, wherein the one or more adaptive CLI measurement fields indicate whether the periodic CLI measurement resources support measuring self-interference associated with a full-duplex communication mode.

Aspect 19: The method of any of Aspects 15-18, wherein the one or more adaptive CLI measurement fields indicate a number of filtering processes that the UE is to apply to the one or more CLI measurement.

Aspect 20: The method of any of Aspects 15-19, wherein the one or more adaptive CLI measurement fields include at least one field that configures multiple options for a CLI measurement parameter, and wherein the method further comprises: transmitting, to the UE, a downlink L2 message to select one of the multiple options configured in the at least one field for the CLI measurement parameter.

Aspect 21: The method of any of Aspects 15-20, further comprising: transmitting, to the UE, a downlink L2 message to activate or deactivate a CLI measurement parameter indicated in the one or more adaptive CLI measurement fields.

Aspect 22: The method of any of Aspects 15-22, wherein the one or more L3 messages include one or more adaptive CLI reporting fields to indicate one or more parameters associated with the CLI report.

Aspect 23: The method of Aspect 22, wherein the one or more adaptive CLI reporting fields indicate whether to report the one or more CLI measurements per receive beam or as an average over all receive beams.

Aspect 24: The method of any of Aspects 22-23, wherein the one or more adaptive CLI reporting fields indicate whether the UE is to include one or more self-interference measurements in the CLI report.

Aspect 25: The method of any of Aspects 22-24, wherein the one or more adaptive CLI reporting fields indicate one or more events to trigger transmission of the CLI report.

Aspect 26: The method of any of Aspects 15-25, further comprising: receiving, from the UE, information that indicates a capability related to a maximum number of CLI measurement resource configurations supported by the UE; and transmitting, to the UE, an L2 message that activates a subset of CLI measurement resources configured for the UE based at least in part on the capability related to the maximum number of CLI measurement resource configurations supported by the UE.

Aspect 27: The method of Aspect 26, wherein the capability received from the UE indicates the maximum number of CLI measurement resource configurations supported by the UE.

Aspect 28: The method of any of Aspects 26-27, wherein the capability received from the UE indicates a maximum number of active CLI measurement resources supported by the UE.

Aspect 29: An apparatus for wireless communication at a device, comprising a processor; memory coupled with the processor; and instructions stored in the memory and executable by the processor to cause the apparatus to perform the method of one or more of Aspects 1-14.

Aspect 30: A device for wireless communication, comprising a memory and one or more processors coupled to the memory, the one or more processors configured to perform the method of one or more of Aspects 1-14.

Aspect 31: An apparatus for wireless communication, comprising at least one means for performing the method of one or more of Aspects 1-14.

Aspect 32: A non-transitory computer-readable medium storing code for wireless communication, the code comprising instructions executable by a processor to perform the method of one or more of Aspects 1-14.

Aspect 33: A non-transitory computer-readable medium storing a set of instructions for wireless communication, the set of instructions comprising one or more instructions that, when executed by one or more processors of a device, cause the device to perform the method of one or more of Aspects 1-14.

Aspect 34: An apparatus for wireless communication at a device, comprising a processor; memory coupled with the processor; and instructions stored in the memory and executable by the processor to cause the apparatus to perform the method of one or more of Aspects 15-28.

Aspect 35: A device for wireless communication, comprising a memory and one or more processors coupled to the memory, the one or more processors configured to perform the method of one or more of Aspects 15-28.

Aspect 36: An apparatus for wireless communication, comprising at least one means for performing the method of one or more of Aspects 15-28.

Aspect 37: A non-transitory computer-readable medium storing code for wireless communication, the code comprising instructions executable by a processor to perform the method of one or more of Aspects 15-28.

Aspect 38: A non-transitory computer-readable medium storing a set of instructions for wireless communication, the set of instructions comprising one or more instructions that, when executed by one or more processors of a device, cause the device to perform the method of one or more of Aspects 15-28.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
   receiving one or more Layer 3 (L3) messages that configure periodic cross-link interference (CLI) measurement resources,
      wherein the one or more L3 messages include one or more adaptive CLI fields, and
      wherein the one or more adaptive CLI fields indicate one or more of:
         whether the periodic CLI measurement resources support measuring self-interference associated with a full-duplex communication mode,
         a number of filtering processes to apply to one or more CLI measurements, or
         whether to include one or more self-interference measurements in a CLI report;
   obtaining the one or more CLI measurements based at least in part on the one or more adaptive CLI fields; and
   transmitting the CLI report, wherein the CLI report includes the one or more CLI measurements.

2. The method of claim 1, wherein the one or more adaptive CLI fields indicate one or more receive beams to use to obtain the one or more CLI measurements.

3. The method of claim 1, wherein the one or more adaptive CLI fields indicate one or more sub-bands included in the periodic CLI measurement resources.

4. The method of claim 1, wherein the one or more adaptive CLI fields indicate whether the periodic CLI measurement resources support measuring the self-interference associated with the full-duplex communication mode.

5. The method of claim 1, wherein the one or more adaptive CLI fields indicate the number of filtering processes to apply to the one or more CLI measurement.

6. The method of claim 1,
   wherein the one or more adaptive CLI fields include at least one field that configures multiple options for a CLI measurement parameter, and
   wherein the method further comprises:
      receiving a downlink Layer 2 message to select one of the multiple options configured in the at least one field for the CLI measurement parameter.

7. The method of claim 1, further comprising:
   receiving a downlink Layer 2 message to activate or deactivate a CLI measurement parameter indicated in the one or more adaptive CLI fields.

8. The method of claim 1, wherein the one or more adaptive CLI fields include one or more adaptive CLI reporting fields associated with the CLI report.

9. The method of claim 8, wherein the one or more adaptive CLI reporting fields indicate whether to report the one or more CLI measurements per receive beam or as an average over all receive beams.

10. The method of claim 8, wherein the one or more adaptive CLI reporting fields indicate whether to include the one or more self-interference measurements in the CLI report.

11. The method of claim 8, wherein the one or more adaptive CLI reporting fields indicate one or more events to trigger transmission of the CLI report.

12. The method of claim 1, further comprising:
   transmitting information that indicates a capability related to a maximum number of CLI measurement resource configurations supported by the UE; and
   receiving a Layer 2 message that activates a subset of CLI measurement resources configured for the UE based at least in part on the capability related to the maximum number of CLI measurement resource configurations supported by the UE.

13. The method of claim 12, wherein the information that indicates the capability indicates the maximum number of CLI measurement resource configurations supported by the UE.

14. The method of claim 12, wherein the information that indicates the capability indicates a maximum number of active CLI measurement resources supported by the UE.

15. A method of wireless communication performed by network entity, comprising:
transmitting, to a user equipment (UE), one or more Layer 3 (L3) messages that configure periodic cross-link interference (CLI) measurement resources,
wherein the one or more L3 messages include one or more adaptive CLI fields, and
wherein the one or more adaptive CLI fields indicate one or more of:
whether the periodic CLI measurement resources support measuring self-interference associated with a full-duplex communication mode,
a number of filtering processes to apply to one or more CLI measurements, or
whether to include one or more self-interference measurements in a CLI report; and
receiving, from the UE, one or more L3 messages carrying the CLI report, wherein the CLI report includes the one or more CLI measurements, and wherein the one or more CLI measurements are based at least in part on the one or more adaptive CLI fields.

16. The method of claim 15, wherein the one or more adaptive CLI fields indicate one or more receive beams that the UE is to use to obtain the one or more CLI measurements.

17. The method of claim 15, wherein the one or more adaptive CLI fields indicate one or more sub-bands included in the periodic CLI measurement resources.

18. The method of claim 15, wherein the one or more adaptive CLI fields indicate whether the periodic CLI measurement resources support measuring the self-interference associated with the full-duplex communication mode.

19. The method of claim 15, wherein the one or more adaptive CLI fields indicate the number of filtering processes that the UE is to apply to the one or more CLI measurement.

20. The method of claim 15,
wherein the one or more adaptive CLI fields include at least one field that configures multiple options for a CLI measurement parameter, and
wherein the method further comprises:
transmitting, to the UE, a downlink Layer 2 message to select one of the multiple options configured in the at least one field for the CLI measurement parameter.

21. The method of claim 15, further comprising:
transmitting, to the UE, a downlink Layer 2 message to activate or deactivate a CLI measurement parameter indicated in the one or more adaptive CLI fields.

22. The method of claim 15, wherein the one or more adaptive CLI fields include one or more adaptive CLI reporting fields associated with the CLI report.

23. The method of claim 22, wherein the one or more adaptive CLI reporting fields indicate whether to report the one or more CLI measurements per receive beam or as an average over all receive beams.

24. The method of claim 22, wherein the one or more adaptive CLI reporting fields indicate whether the UE is to include the one or more self-interference measurements in the CLI report.

25. The method of claim 22, wherein the one or more adaptive CLI reporting fields indicate one or more events to trigger transmission of the CLI report.

26. The method of claim 15, further comprising:
receiving, from the UE, information that indicates a capability related to a maximum number of CLI measurement resource configurations supported by the UE; and
transmitting, to the UE, a Layer 2 message that activates a subset of CLI measurement resources configured for the UE based at least in part on the capability related to the maximum number of CLI measurement resource configurations supported by the UE.

27. The method of claim 26, wherein the information that indicates the capability indicates the maximum number of CLI measurement resource configurations supported by the UE.

28. The method of claim 26, wherein the information that indicates the capability indicates a maximum number of active CLI measurement resources supported by the UE.

29. A user equipment (UE) for wireless communication, comprising:
a memory; and
one or more processors, coupled to the memory, configured to:
receive one or more Layer 3 (L3) messages that configure periodic cross-link interference (CLI) measurement resources,
wherein the one or more L3 messages include one or more adaptive CLI fields, and
wherein the one or more adaptive CLI fields indicate one or more of:
whether the periodic CLI measurement resources support measuring self-interference associated with a full-duplex communication mode,
a number of filtering processes to apply to one or more CLI measurements, or
whether to include one or more self-interference measurements in a CLI report;
obtain the one or more CLI measurements based at least in part on the one or more adaptive CLI fields; and
transmit the CLI report, wherein the CLI report includes the one or more CLI measurements.

30. A network entity for wireless communication, comprising:
a memory; and
one or more processors, coupled to the memory, configured to:
transmit, to a user equipment (UE), one or more Layer 3 (L3) messages that configure periodic cross-link interference (CLI) measurement resources,
wherein the one or more L3 messages include one or more adaptive CLI fields, and
wherein the one or more adaptive CLI fields indicate one or more of:
whether the periodic CLI measurement resources support measuring self-interference associated with a full-duplex communication mode,
a number of filtering processes to apply to one or more CLI measurements, or
whether to include one or more self-interference measurements in a CLI report; and
receive, from the UE, one or more L3 messages carrying the CLI report, wherein the CLI report includes the one or more CLI measurements, and wherein the one or more CLI measurements are based at least in part on the one or more adaptive CLI fields.

* * * * *